US012803875B2

(12) United States Patent
Ni et al.

(10) Patent No.: US 12,803,875 B2
(45) Date of Patent: Nov. 17, 2026

(54) SYSTEM AND METHOD OF CLOUD BASED CONGESTION CONTROL FOR VIRTUALIZED BASE STATION

(71) Applicant: Outdoor Wireless Networks LLC, Richardson, TX (US)

(72) Inventors: James J Ni, Medford, MA (US); Shanthakumar Ramakrishnan, Westford, MA (US); Ehsan Daeipour, Southborough, MA (US); Arthur J. Barabell, Sudbury, MA (US); Balaji B Raghothaman, Chester Springs, PA (US)

(73) Assignee: Outdoor Wireless Networks LLC, Richardson, TX (US)

( * ) Notice: Subject to any disclaimer, the term of this patent is extended or adjusted under 35 U.S.C. 154(b) by 49 days.

(21) Appl. No.: 18/730,724

(22) PCT Filed: Jan. 19, 2023

(86) PCT No.: PCT/US2023/060906

§ 371 (c)(1),
(2) Date: Jul. 19, 2024

(87) PCT Pub. No.: WO2023/141506

PCT Pub. Date: Jul. 27, 2023

(65) Prior Publication Data

US 2025/0112829 A1 Apr. 3, 2025

Related U.S. Application Data

(60) Provisional application No. 63/300,913, filed on Jan. 19, 2022.

(51) Int. Cl.

| | |
|---|---|
| ***H04L 12/46*** | (2006.01) |
| ***H04L 41/0895*** | (2022.01) |
| ***H04L 43/20*** | (2022.01) |

(52) U.S. Cl.
CPC .......... *H04L 41/0895* (2022.05); *H04L 43/20* (2022.05)

(58) Field of Classification Search
CPC ...... H04L 41/0895; H04L 43/20; H04L 12/46
(Continued)

(56) References Cited

U.S. PATENT DOCUMENTS

| | | | |
|---|---|---|---|
| 2017/0251339 | A1 | 8/2017 | Addepalli et al. |
| 2019/0138524 | A1 | 5/2019 | Singh et al. |

(Continued)

FOREIGN PATENT DOCUMENTS

| | | | |
|---|---|---|---|
| EP | 3361701 | A1 | 8/2018 |
| WO | 2023141506 | A1 | 7/2023 |

OTHER PUBLICATIONS

NFV-Throttle: An Overload Control Framework for Network Function Virtualization, Domenico Cotroneo, Roberto Natella, and Stefano Rosiello, IEEE Transactions On Network and Service Management, vol. 14, No. 4, Dec. 2017 (Year: 2017).*

(Continued)

*Primary Examiner* — Jude Jean Gilles
(74) *Attorney, Agent, or Firm* — Fogg & Powers LLC

(57) ABSTRACT

A system including a scalable cloud environment configured to implement a plurality of virtualized entities that implement a part of a base station to provide wireless service to user equipment. The plurality of virtualized entities comprises first and second virtualized entities. Processing performed by the first virtualized entity generates data that is used by processing performed by the second virtualized entity. Cloud native software included in the scalable cloud environment is configured to collect cloud-native metrics associated with implementing the second virtualized entity in the scalable cloud environment. The existence of a congestion condition for the second virtualized entity can be (Continued)

100 determined based on the cloud-native metrics collected for the second virtualized entity and, in response to determining that the congestion condition exists for the second virtualized entity, a control action can be taken in order to throttle the first virtualized entity.

28 Claims, 15 Drawing Sheets

(58) Field of Classification Search
USPC .......................................................... 709/238
See application file for complete search history.

(56) References Cited

U.S. PATENT DOCUMENTS

| | | | |
|---|---|---|---|
| 2019/0158605 A1* | 5/2019 | Markuze | H04L 12/4625 |
| 2019/0268421 A1* | 8/2019 | Markuze | H04L 67/10 |
| 2020/0125389 A1 | 4/2020 | Palermo et al. | |
| 2020/0404069 A1 | 12/2020 | Li et al. | |

OTHER PUBLICATIONS

International Searching Authority, "International Search Report and Written Opinion", dated May 10, 2023, from PCT Application No. PCT/US2023/060906, pp. 1 through 10, Published in: WO.
Controneo et al., "NVF-Throttle: An Overload Control Framework for Network Function Virtualization", IEEE Transactions on Network and Service Management, vol. 14, Issue 4, Sep. 14, 2017, pp. 949-963.

* cited by examiner

300

SYSTEM AND METHOD OF CLOUD BASED CONGESTION CONTROL FOR VIRTUALIZED BASE STATION

CROSS-REFERENCE TO RELATED APPLICATIONS

This application is a 371 National Stage Application of International Patent Application No. PCT/US2023/060906, filed on Jan. 19, 2023, which claims the benefit of U.S. Provisional Patent Application Ser. No. 63/300,913, filed on Jan. 19, 2022, both of which are hereby incorporated herein by reference in their entirety.

BACKGROUND

Cloud-based virtualization of Fifth Generation (5G) base stations (also referred to as "g NodeBs" or "gNBs") is widely promoted by standards organizations, wireless network operators, and wireless equipment vendors. Such an approach can help provide better high-availability and scalability solutions as well as addressing other issues in the network.

FIG. 1 is a block diagram illustrating a typical 5G distributed gNB. In general, a distributed 5G gNB can be partitioned into different entities, each of which can be implemented in different ways. For example, each entity can be implemented as a physical network function (PNF) or a virtual network function (VNF) and in different locations within an operator's network (for example, in the operator's "edge cloud" or "central cloud").

In the particular example shown in FIG. 1, a distributed 5G gNB 100 is partitioned into one or more central units (CUs) 102, one or more distributed units (DUs) 104, and one or more radio units (RUs) 106. In this example, each CU 102 is further partitioned into a central unit control-plane (CU-CP) entity 108 and one or more central unit user-plane (CU-UPs) entities 110, which implements Layer 3 and non-time critical Layer 2 functions for the gNB 100. Each DU 104 is configured to implement the time critical Layer 2 functions and at least some of the Layer 1 (also referred to as the Physical Layer) functions for the gNB 100. In this example, each RU 106 is configured to implement the radio frequency (RF) interface and the physical layer functions for the gNB 100 that are not implemented in the DU 104.

Each RU 106 is typically implemented as a physical network function (PNF) and is deployed in a physical location where radio coverage is to be provided. Each DU 104 is typically implemented as a virtual network function (VNF) and, as the name implies, is typically deployed in a distributed manner in the operator's edge cloud. Each CU-CP 108 and CU-UP 110 is typically implemented as a virtual network function (VNF) and, as the name implies, is typically centralized and deployed in the operator's central cloud.

When deploying a distributed gNB 100, appropriate capacity planning based on the specific needs of the site is performed and will determine the number of RUs 106, DUs 104, CU-CPs 108, and CU-UPs 110 deployed and their respective capacity parameters, as well as the capacities of the links between the CU-CPs 108 and the DUs 104 and between the CU-UPs 110 and the DUs 104. However, to more efficiently use limited capital resources, operator's typically use some degree of oversubscription at all levels in deploying a distributed gNB 100. Oversubscription refers to the relationship between the theoretical maximum (worst case) required capacity and the actual deployed capacity for a given resource. Use of oversubscription for a given resource introduces the likelihood of congestion if the actual demand for that resource exceeds the actual deployed capacity for that resource. In theory, if the actual deployed capacity for that resource can be scaled dynamically (for example, using cloud and virtualization technology), such congestion can be avoided to some extent. However, in reality, such dynamic scaling is not perfect and is typically not able to prevent congestion in some situations. As a result, some form of congestion control can still be beneficial when implementing a distributed gNB 100.

SUMMARY

One embodiment is directed to a system to provide wireless service to user equipment. The system comprises a scalable cloud environment configured to implement a plurality of virtualized entities that implement a part of a base station to provide the wireless service to the user equipment. The plurality of virtualized entities comprises a first virtualized entity configured to perform first processing associated with providing the wireless service to the user equipment and a second virtualized entity configured to perform second processing associated with providing the wireless service to the user equipment. The first processing generates data that is used by the second processing and that is communicated from the first virtualized entity to the second virtualized entity. The scalable cloud environment comprises cloud native software that is configured to collect cloud-native metrics associated with implementing the second virtualized entity in the scalable cloud environment. The system is configured to determine when a congestion condition exists for the second virtualized entity based on the cloud-native metrics collected for the second virtualized entity. The system is configured to, in response to determining that the congestion condition exists for the second virtualized entity, cause a control action to be taken in order to throttle the first virtualized entity.

Another embodiment is directed to a method of providing wireless service to user equipment. The method comprises using a scalable cloud environment configured to implement a plurality of virtualized entities that implement a part of a base station to provide the wireless service to the user equipment. The plurality of virtualized entities comprises a first virtualized entity configured to perform first processing associated with providing the wireless service to the user equipment and a second virtualized entity configured to perform second processing associated with providing the wireless service to the user equipment. The first processing generates data that is used by the second processing and that is communicated from the first virtualized entity to the second virtualized entity. The method further comprises collecting, using cloud native software included in the scalable cloud environment, metrics associated with implementing the second virtualized entity in the scalable cloud environment and determining when a congestion condition exists for the second virtualized entity based on the cloud-native metrics collected for the second virtualized entity. The method further comprises, in response to determining that the congestion condition exists for the second virtualized entity, causing a control action to be taken in order to throttle the first virtualized entity.

The details of various embodiments are set forth in the accompanying drawings and the description below. Other features and advantages will become apparent from the description, the drawings, and the claims.

DRAWINGS

Figure 3:
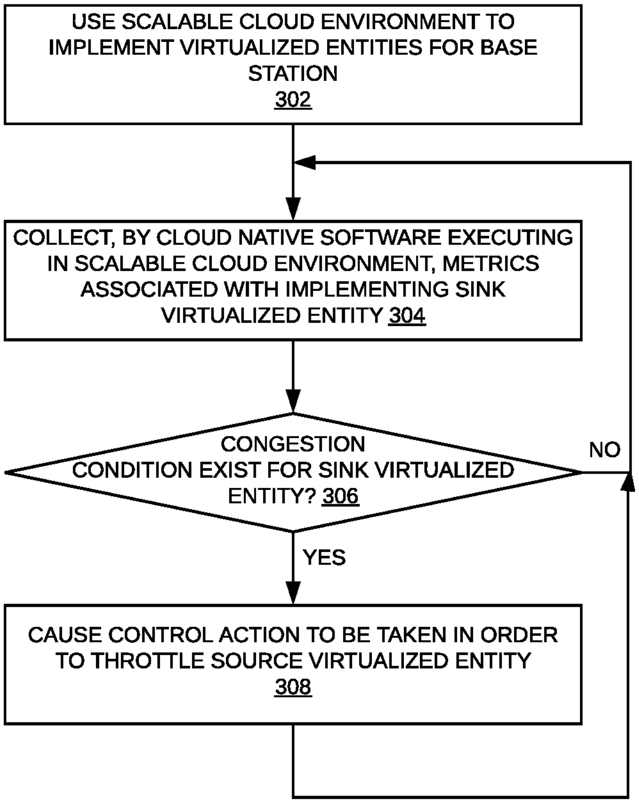

FIG. 3 comprises a high-level flowchart illustrating one exemplary embodiment of a method of providing wireless service to user equipment using a scalable cloud environment where congestion conditions are addressed.

Figure 1:
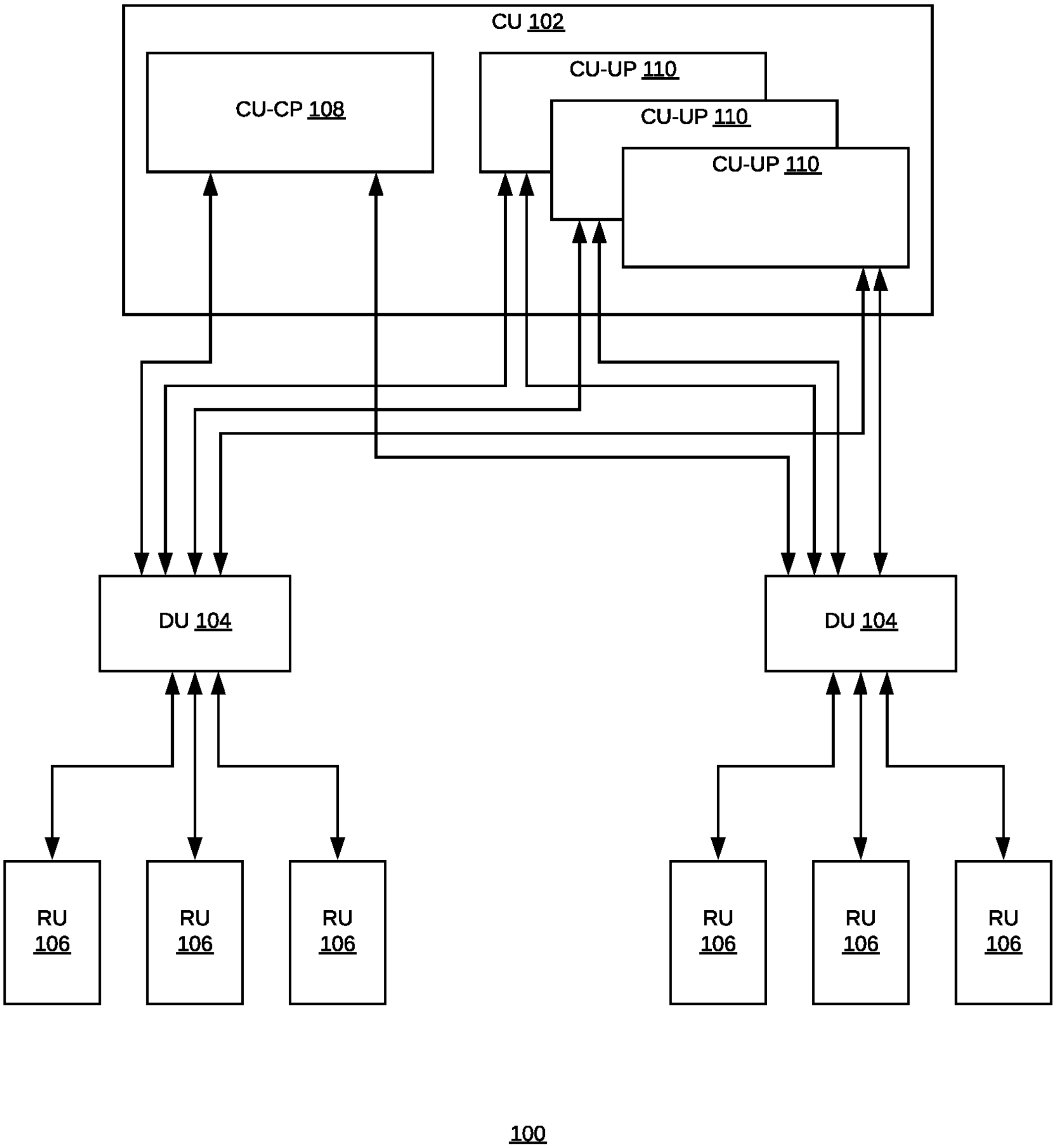
FIG. 1 is a block diagram illustrating a typical 5G distributed gNB.
Figure 2:
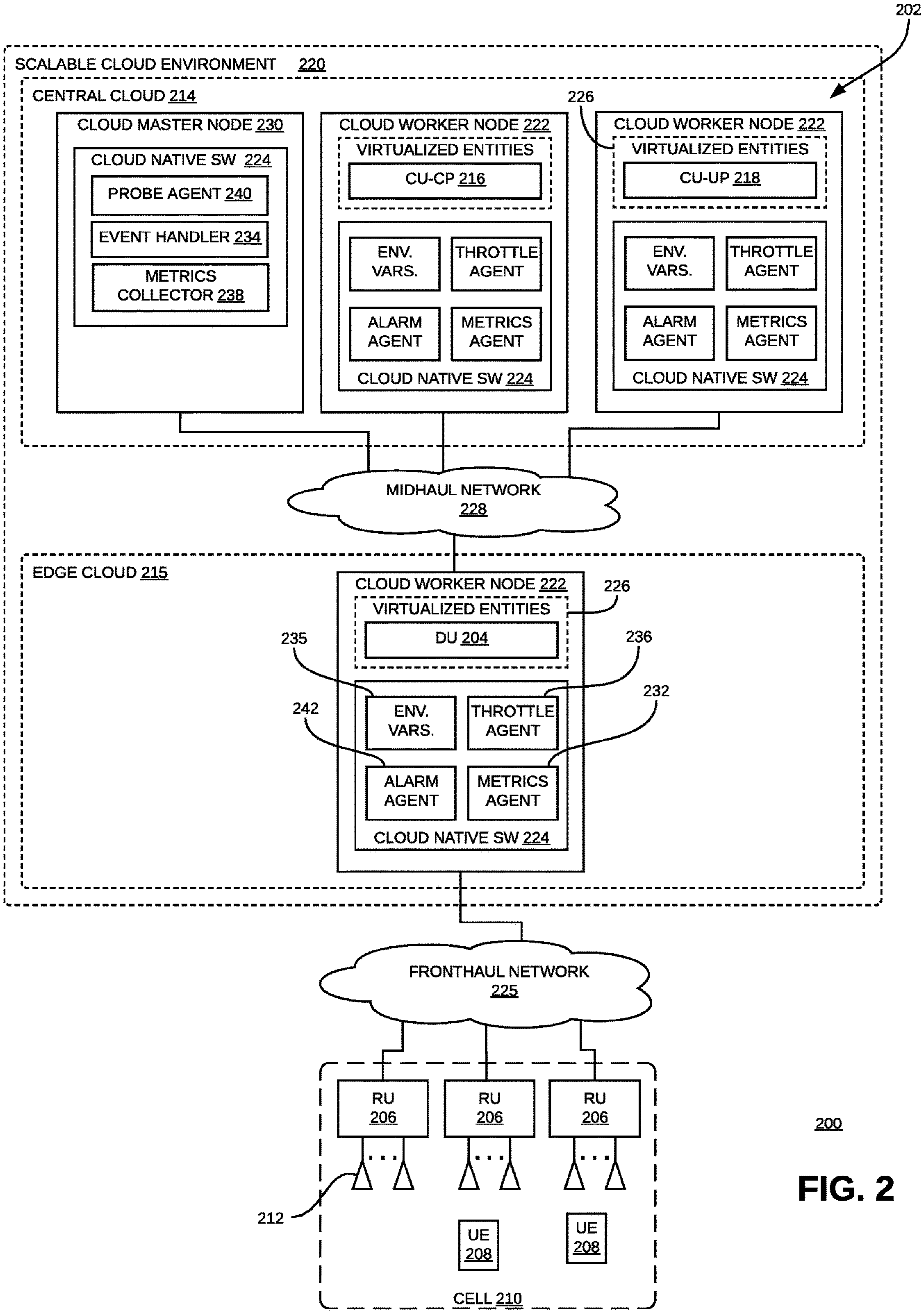
FIG. 2 is a block diagram illustrating one exemplary embodiment of a distributed 5G gNB in which the congestion control techniques described here can be used.
Figure 4:
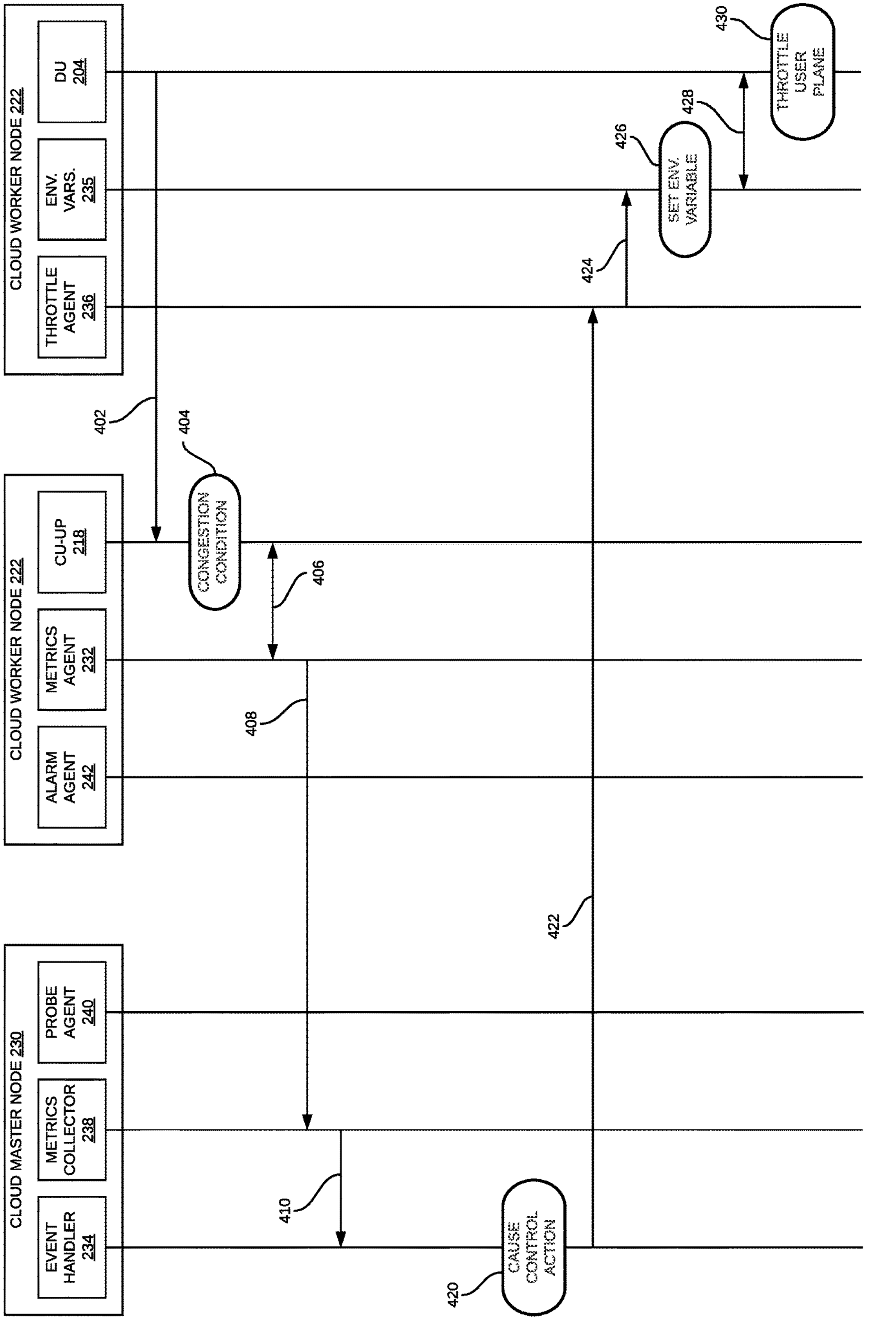

FIG. 4 is a sequence diagram illustrating the operation of the exemplary embodiment shown in FIG. 2 for a first configuration in the case of a congestion condition existing at a CU-UP.

Figure 5:
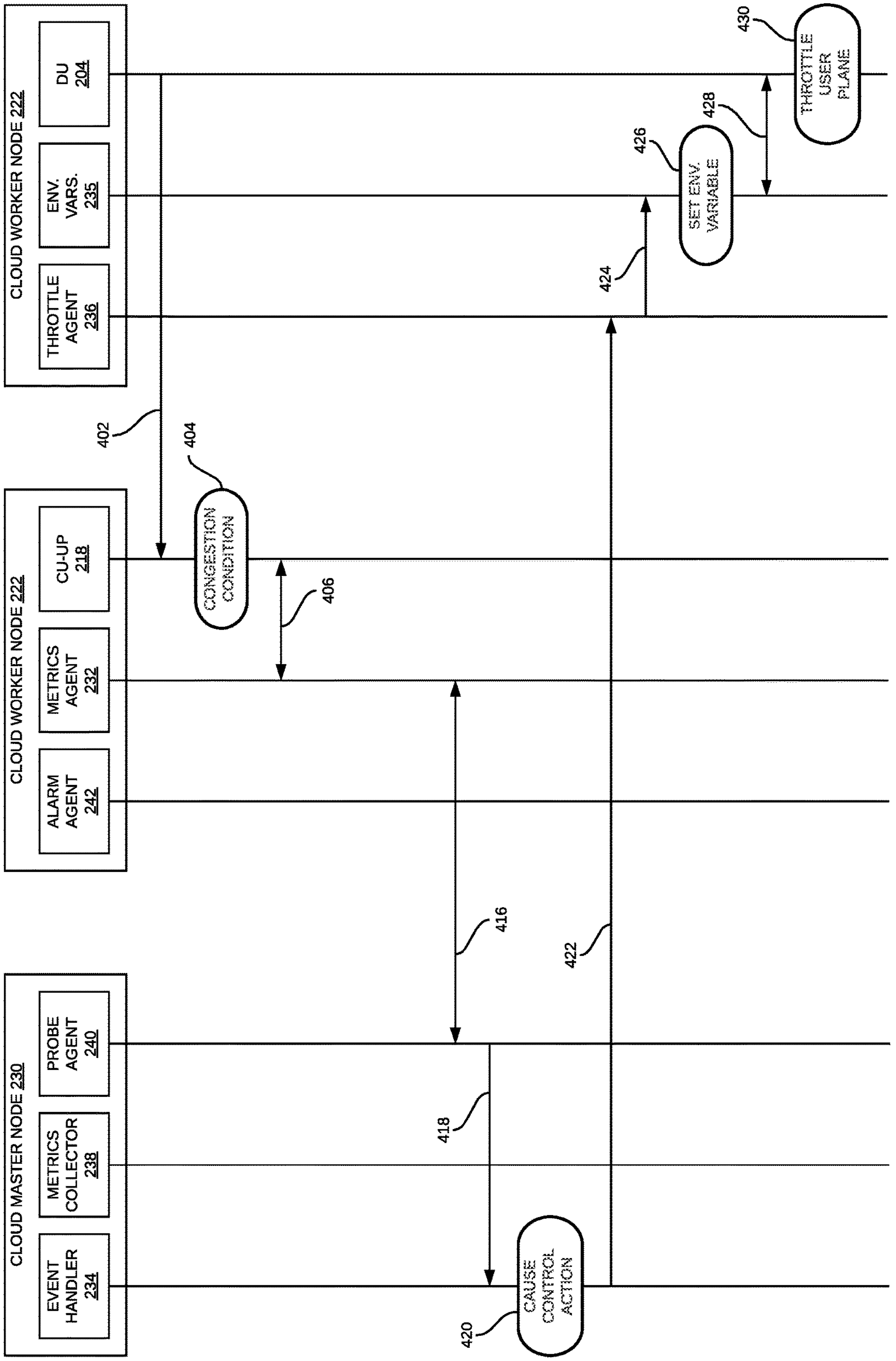

FIG. 5 is a sequence diagram illustrating the operation of the exemplary embodiment shown in FIG. 2 for a second configuration in the case of a congestion condition existing at a CU-UP.

Figure 6:
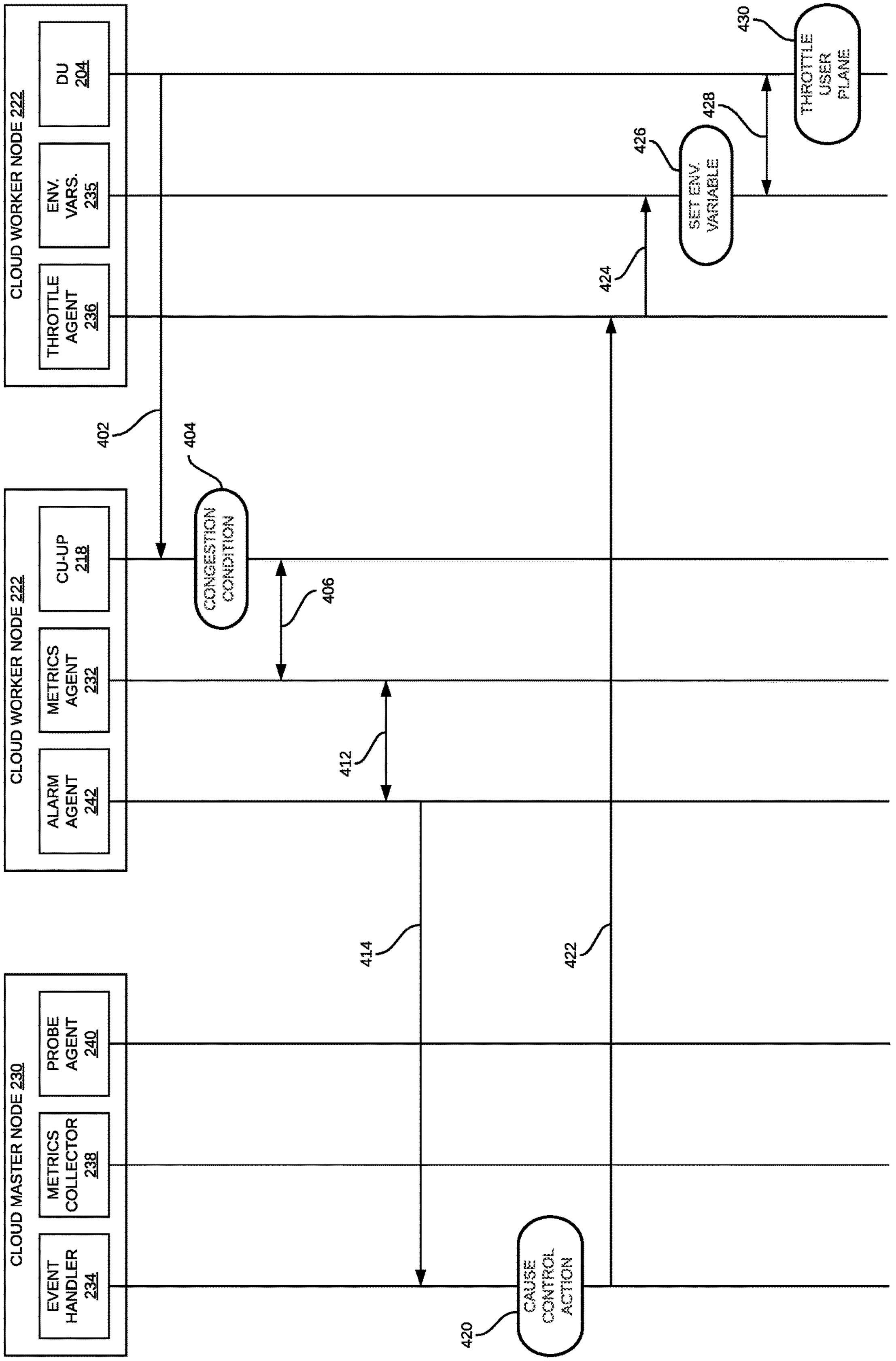

FIG. 6 is a sequence diagram illustrating the operation of the exemplary embodiment shown in FIG. 2 for a third configuration in the case of a congestion condition existing at a CU-UP.

Figure 7:
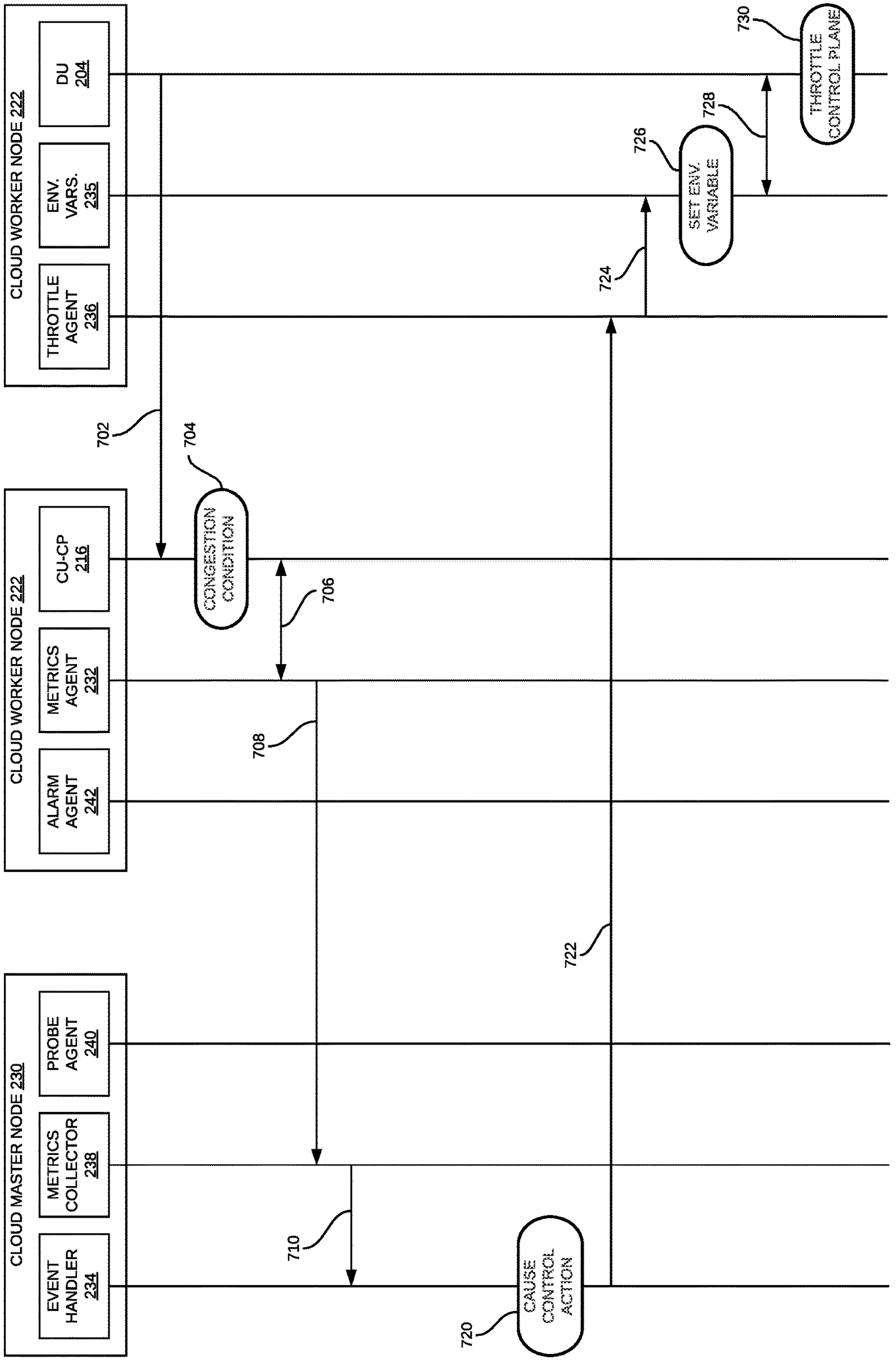

FIG. 7 is a sequence diagram illustrating the operation of the exemplary embodiment shown in FIG. 2 for a first configuration in the case of a congestion condition existing at a CU-CP.

Figure 8:
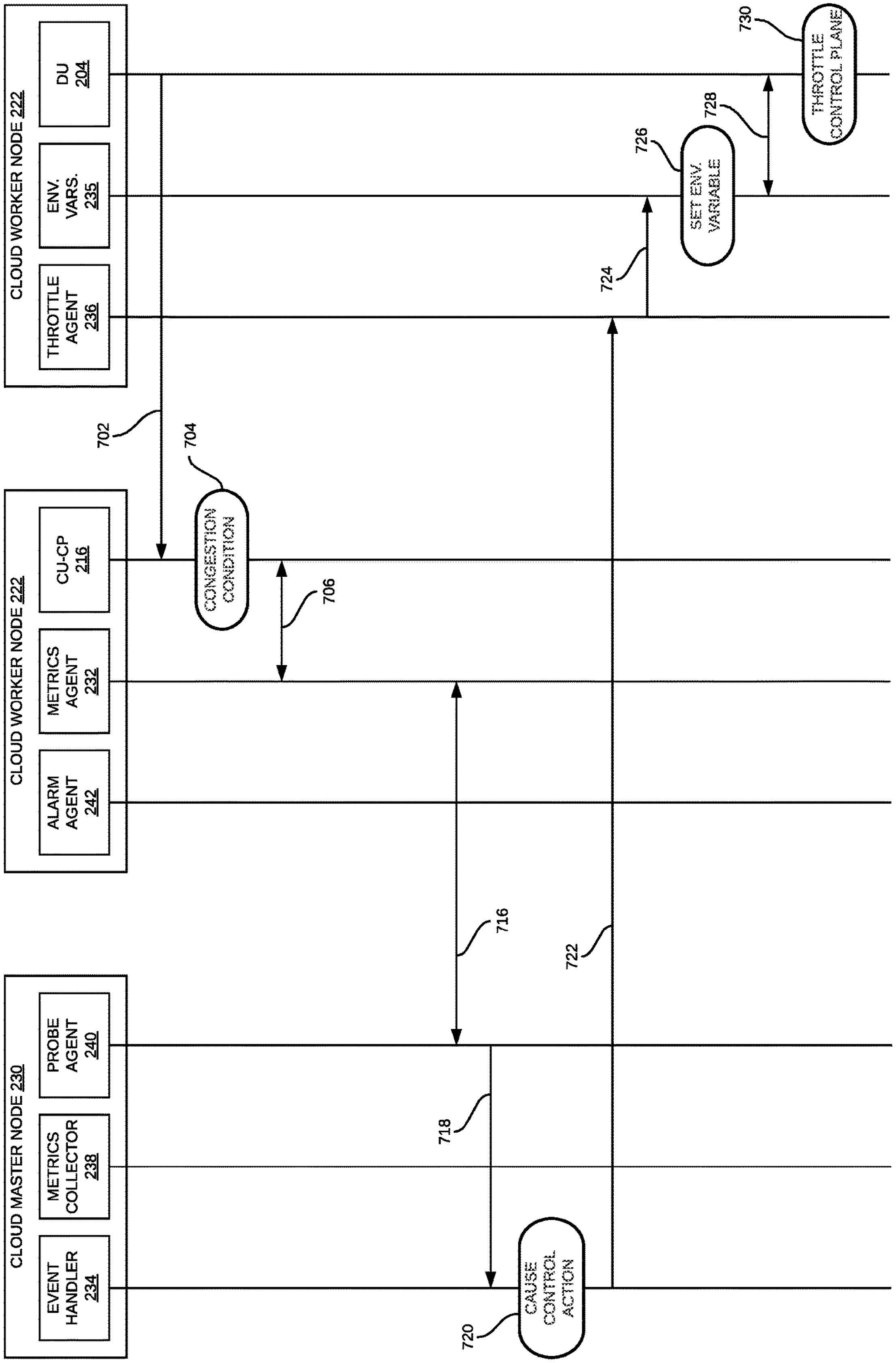

FIG. 8 is a sequence diagram illustrating the operation of the exemplary embodiment shown in FIG. 2 for a second configuration in the case of a congestion condition existing at a CU-CP.

Figure 9:
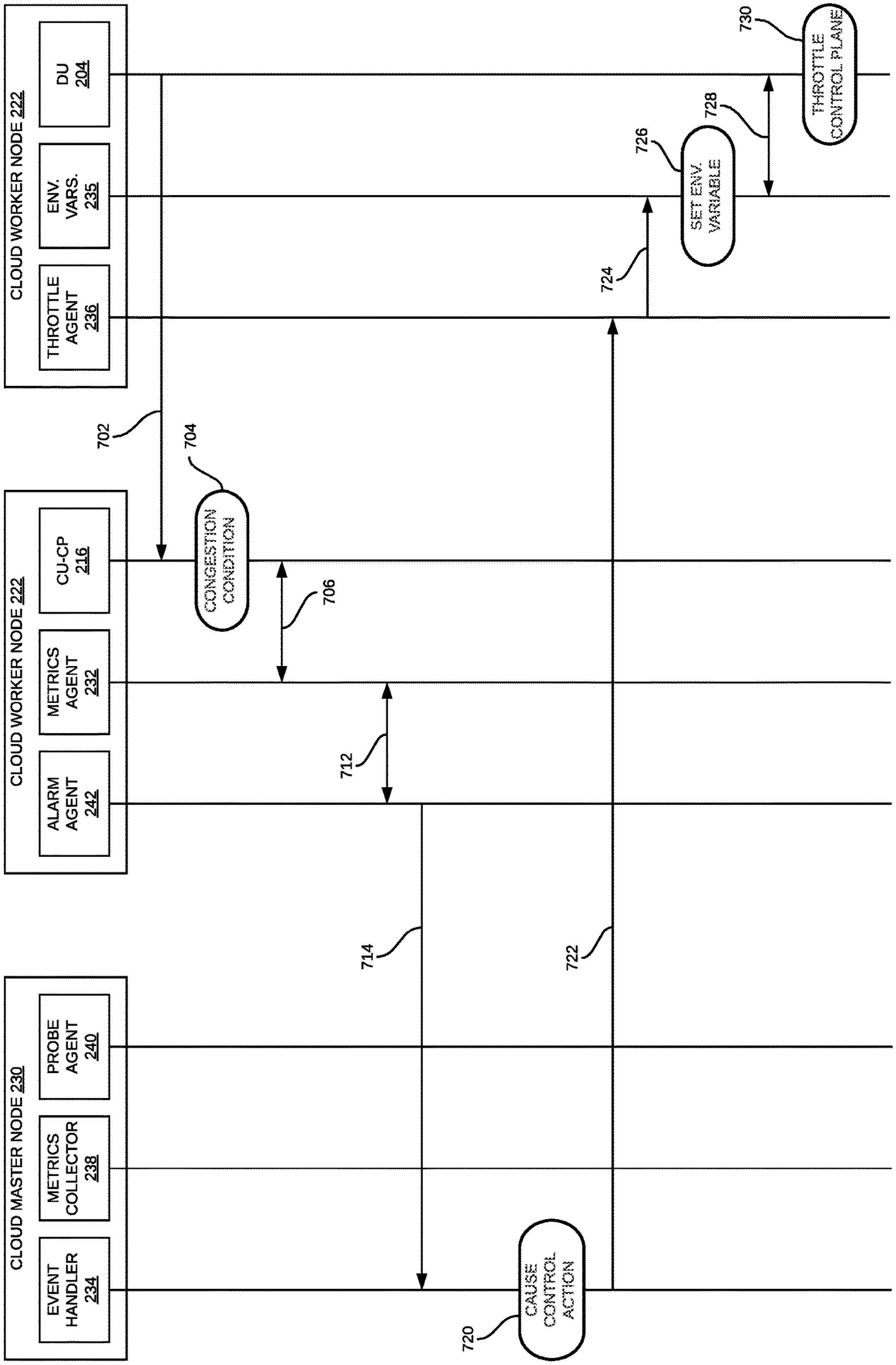

FIG. 9 is a sequence diagram illustrating the operation of the exemplary embodiment shown in FIG. 2 for a third configuration in the case of a congestion condition existing at a CU-CP.

Figure 10:
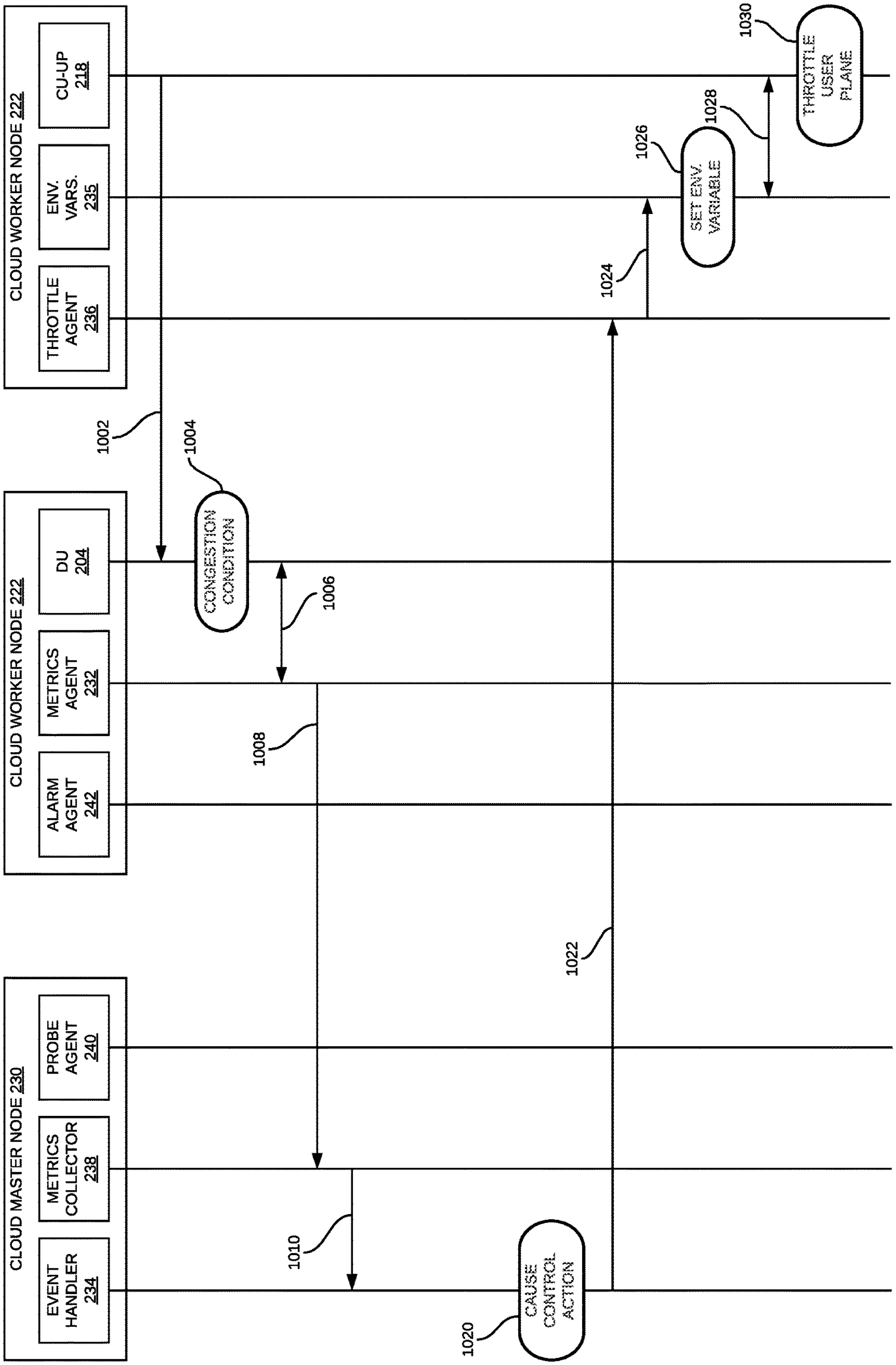

FIG. 10 is a sequence diagram illustrating the operation of the exemplary embodiment shown in FIG. 2 for a first configuration in the case of a congestion condition existing at a DU in connection with the user-plane processing it performs.

Figure 11:
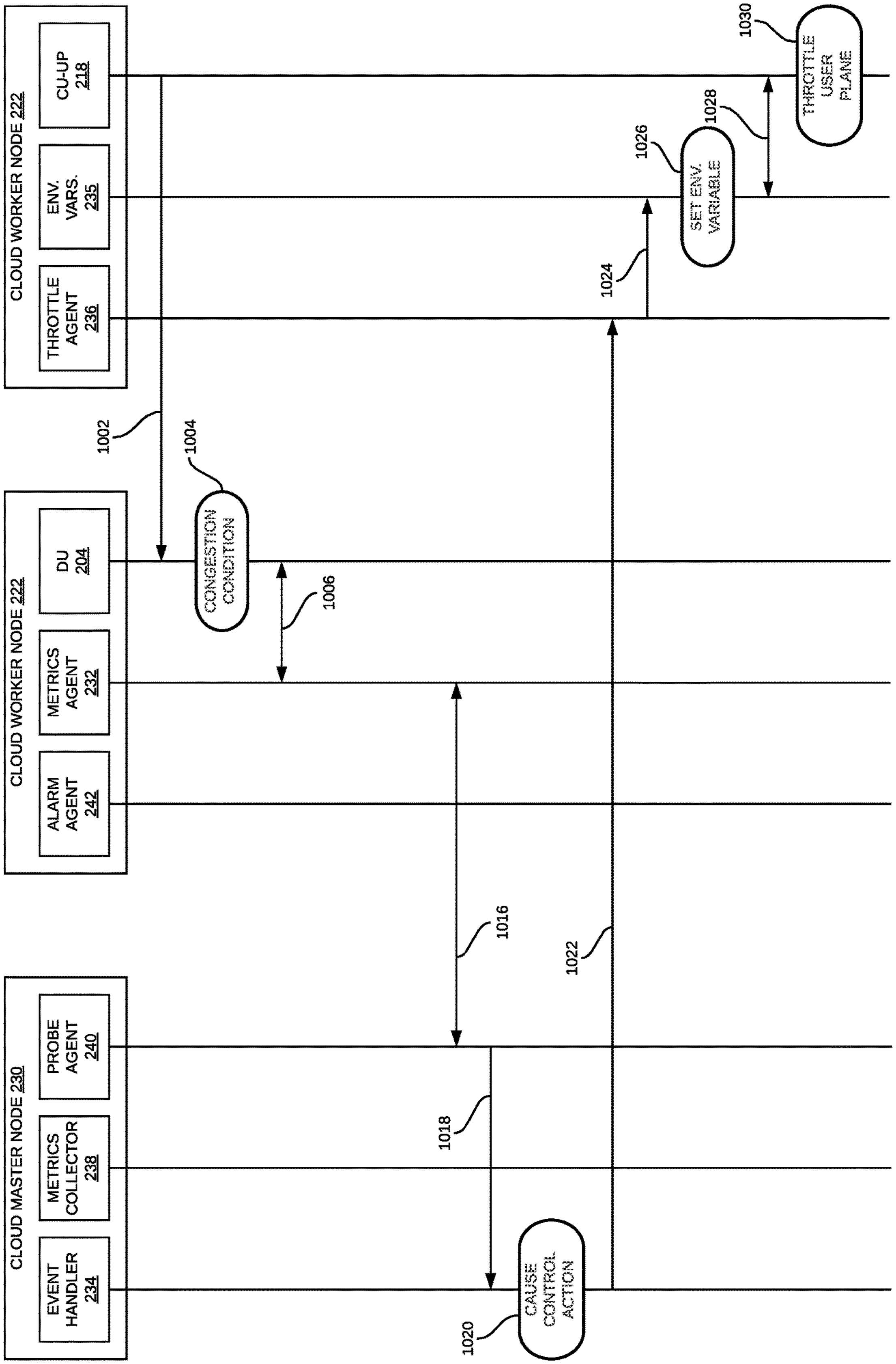

FIG. 11 is a sequence diagram illustrating the operation of the exemplary embodiment shown in FIG. 2 for a second configuration in the case of a congestion condition existing at a DU in connection with the user-plane processing it performs.

Figure 12:
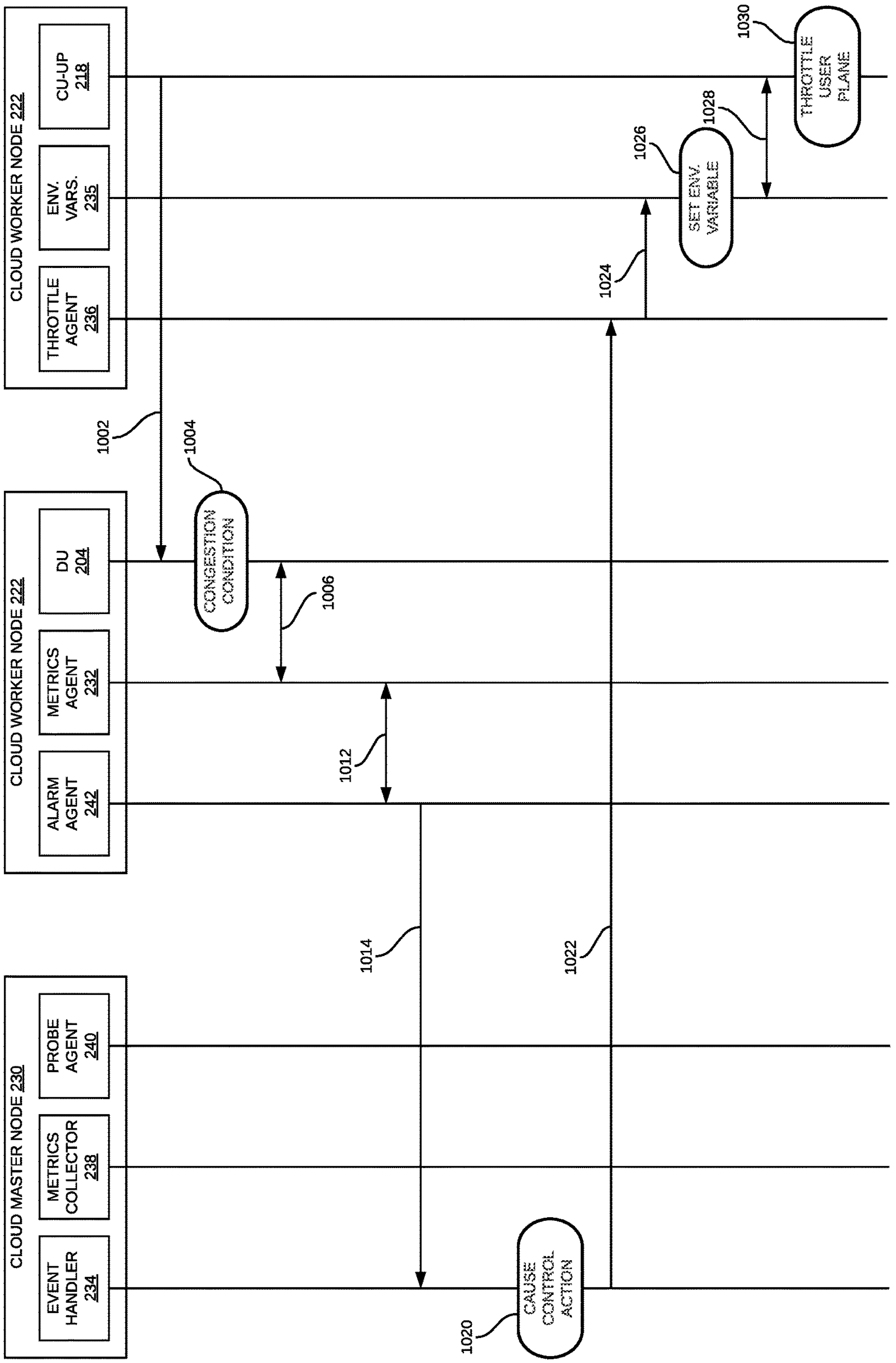

FIG. 12 is a sequence diagram illustrating the operation of the exemplary embodiment shown in FIG. 2 for a third configuration in the case of a congestion condition existing at a DU in connection with the user-plane processing it performs.

Figure 13:
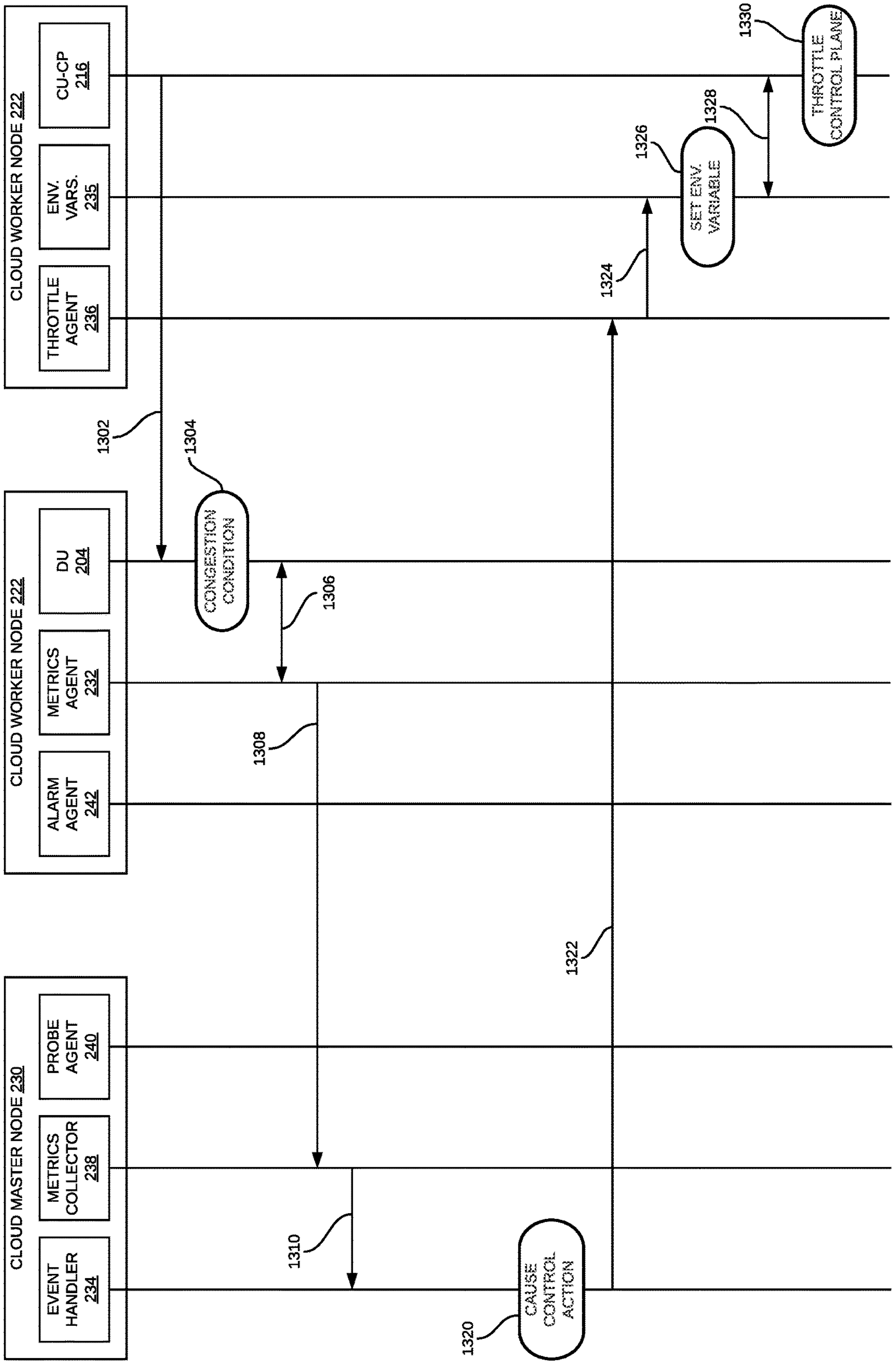

FIG. 13 is a sequence diagram illustrating the operation of the exemplary embodiment shown in FIG. 2 for a first configuration in the case of a congestion condition existing at a DU in connection with the control-plane processing it performs.

Figure 14:
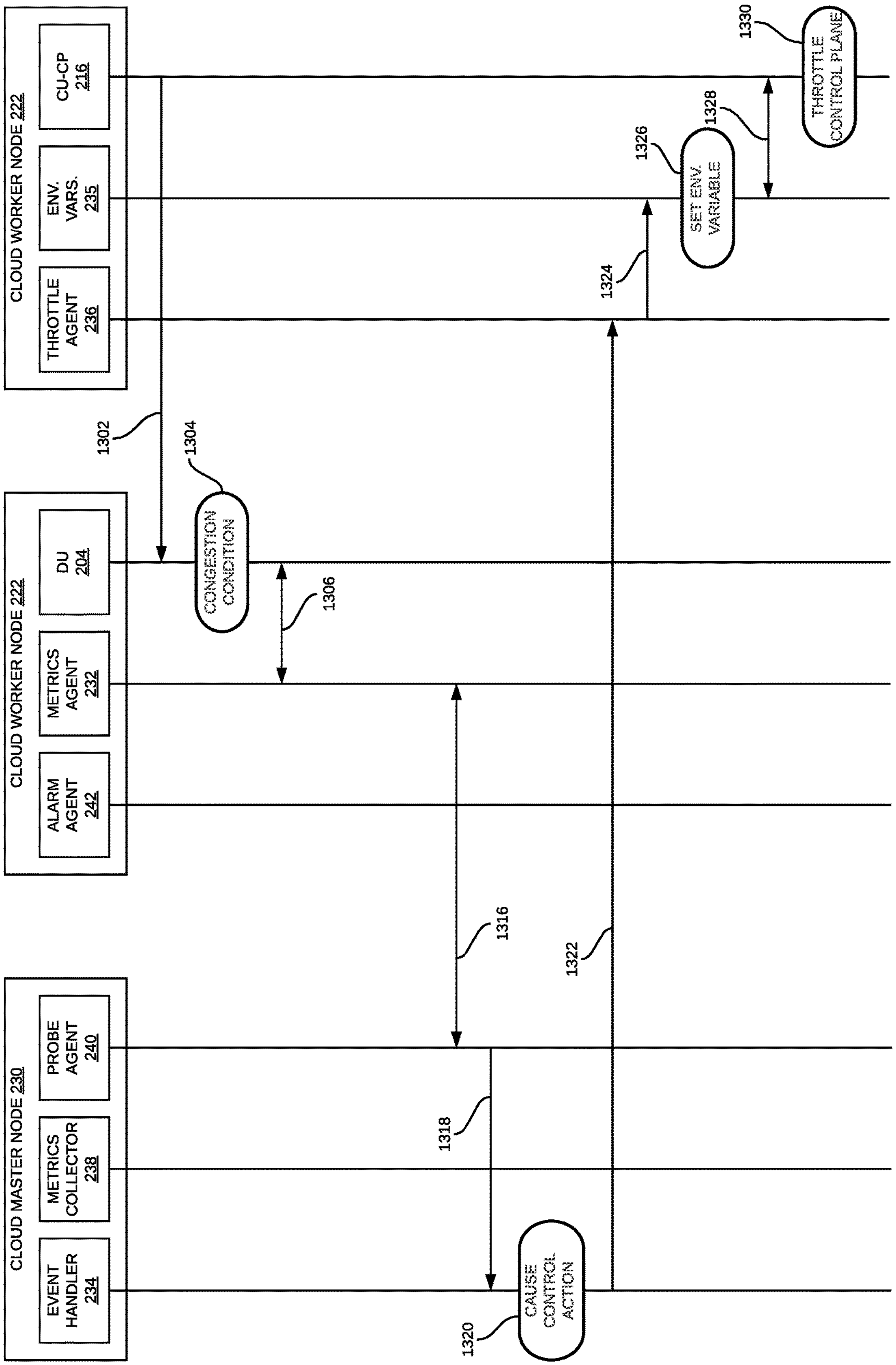

FIG. 14 is a sequence diagram illustrating the operation of the exemplary embodiment shown in FIG. 2 for a second configuration in the case of a congestion condition existing at a DU in connection with the control-plane processing it performs.

Figure 15:
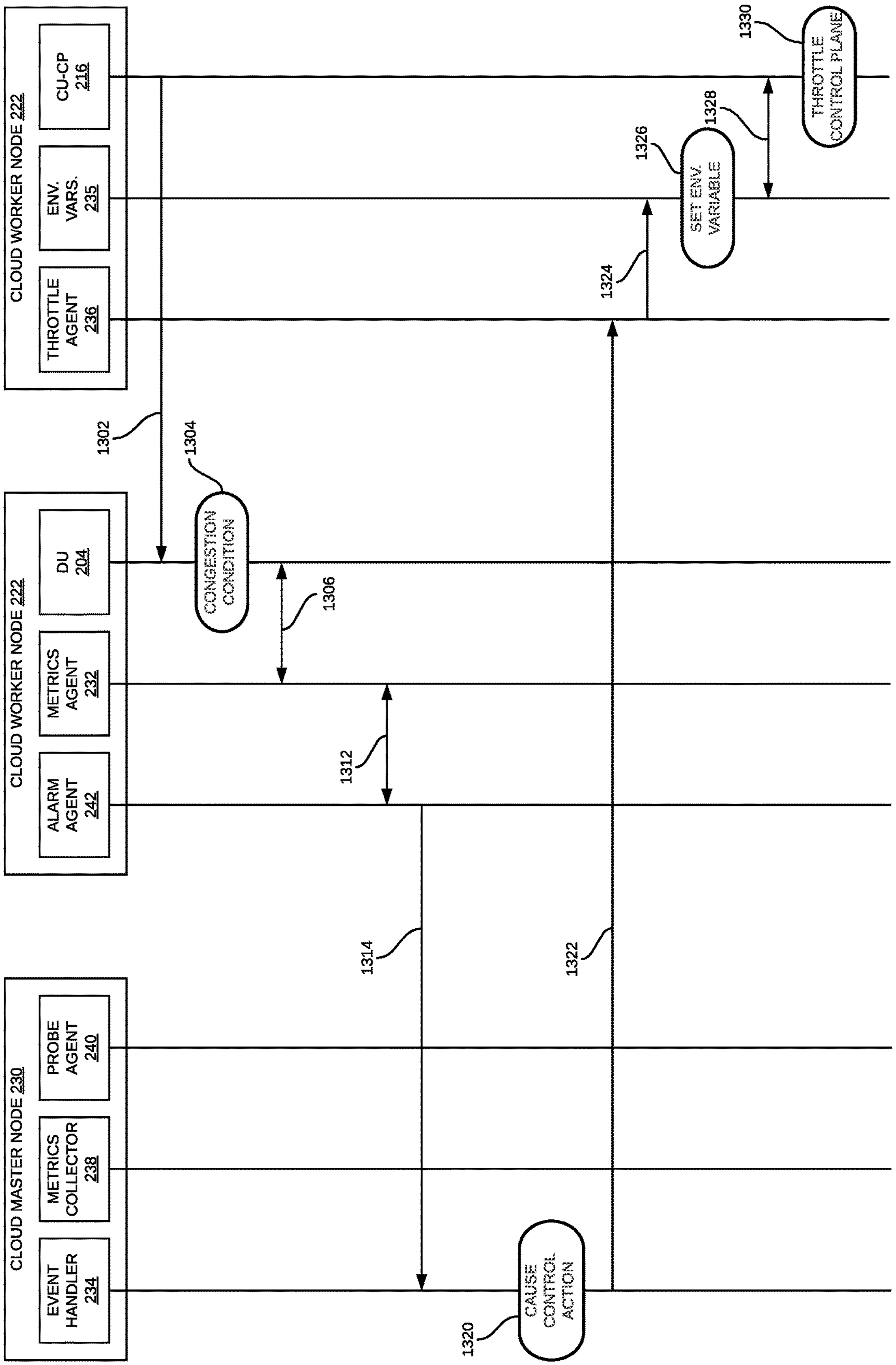

FIG. 15 is a sequence diagram illustrating the operation of the exemplary embodiment shown in FIG. 2 for a third configuration in the case of a congestion condition existing at a DU in connection with the control-plane processing it performs.

Like reference numbers and designations in the various drawings indicate like elements.

DETAILED DESCRIPTION

FIG. 2 is a block diagram illustrating one exemplary embodiment of a distributed 5G gNB 200 in which the congestion control techniques described here can be used. In general, the 5G gNB 200 is implemented using multiple entities that are communicatively coupled to each other and where some of the entities are distributed. In the particular exemplary embodiment shown in FIG. 2, the distributed 5G gNB 200 is partitioned into one or more central units (CUs) 202 (each of which is further partitioned into one central unit control-plane (CU-CP) entity 216 and one or more central unit user-plane (CU-UP) entities 218), one or more distributed units (DUs) 204, and one or more radio (or remote) units (RUs) 206. In this exemplary embodiment the 5G gNB 200 is configured so that each CU 202 is configured to serve one or more DUs 204 and each DU 204 is configured to serve one or more RUs 206. In the particular configuration shown in FIG. 2, a single CU 202 serves a single DU 204, and the DU 204 shown in FIG. 2 serves three RUs 206. However, the particular configuration shown in FIG. 2 is only one example; other numbers of CUs 202, DUs 204, and RUs 206 can be used. Also, the number of DUs 204 served by each CU 202 can vary from CU 202 to CU 202; likewise, the number of RUs 206 served by each DU can vary from DU 204 to DU 204.

In general, the distributed gNB 200 is configured to provide wireless service to various numbers of user equipment (UEs) 208 using one or more cells 210 (only one of which is shown in FIG. 2 for ease of illustration). Unless explicitly stated to the contrary, references to Layer 1, Layer 2, Layer 3, and other or equivalent layers (such as the Physical Layer or the Media Access Control (MAC) Layer) refer to layers of the particular wireless interface (for example, 4G LTE or 5G NR) used for wirelessly communicating with UEs 208 served by each cell 210. Furthermore, it is also to be understood that 5G NR embodiments can be used in both standalone and non-standalone modes (or other modes developed in the future) and the following description is not intended to be limited to any particular mode. Moreover, although some embodiments are described here as being implemented for use with 5G NR, other embodiments can be implemented for use with other wireless interfaces and the following description is not intended to be limited to any particular wireless interface.

Each RU 206 includes or is coupled to a respective set of one or more antennas 212 via which downlink RF signals are radiated to UEs 208 and via which uplink RF signals transmitted by UEs 208 are received. In one configuration (used, for example, in indoor deployments), each RU 206 is co-located with its respective set of antennas 212 and is remotely located from the DU 204 and CU 202 serving it as well as the other RUs 206. In another configuration (used, for example, in outdoor deployments), the respective sets of antennas 212 for multiple RUs 206 are deployed together in a sectorized configuration (for example, mounted at the top of a tower or mast), with each set of antennas 202 serving a different sector. In such a sectorized configuration, the RUs 206 need not be co-located with the respective sets of antennas 212 and, for example, can be co-located together (for example, at the base of the tower or mast structure) and, possibly, co-located with its serving DUs 204. Other configurations can be used The gNB 200 is implemented using a scalable cloud environment 220 in which resources used to instantiate each type of entity can be scaled horizontally (that is, by increasing or decreasing the number of physical computers or other physical devices) and vertically (that is, by increasing or decreasing the "power" (for example, by increasing the amount of processing and/or memory resources) of a given physical computer or other physical device). The scalable cloud environment 220 can be implemented in various ways. For example, the scalable cloud environment 220 can be implemented using hardware virtualization, operating system virtualization, and application virtualization (also referred to as containerization) as well as various combinations of two or more the preceding. The scalable cloud environment 220 can be implemented in other ways. In one example shown in FIG. 2, the scalable cloud environment 220 is implemented in a distributed manner. That is, the scalable cloud environment 220 is implemented as a distributed scalable cloud environment 220 comprising at least one central cloud 214 and at least one edge cloud 215.

In the exemplary embodiment shown in FIG. 2, each RU 206 is implemented as a physical network function (PNF) and is deployed in or near a physical location where radio coverage is to be provided. In this exemplary embodiment, each DU 204 is implemented as a virtual network function (VNF) and, as the name implies, is distributed and deployed in a distributed manner in the edge cloud 215. Each CU-CP 216 and CU-UP 218 is implemented as a respective VNF and, as the name implies, is centralized and deployed in the central cloud 214. In the exemplary embodiment shown in FIG. 2, the CU 202 and the entities used to implement it are communicatively coupled to each DU 204 served by the CU 202 (and the entities used to implement each such DU 204) over a midhaul network 228 (for example, a network that supports the Internet Protocol (IP)), and each DU 204 and the entities used to implement it are communicatively coupled to each RU 206 served by the DU 204 using a fronthaul network 225 (for example, a switched Ethernet network that supports the IP).

As shown in FIG. 2, the scalable cloud environment 220 comprises one or more cloud worker nodes 222 that are configured to execute cloud native software 224 that, in turn, is configured to instantiate, delete, communicate with, and manage one or more virtualized entities 226. In general, each virtualized entity 226 can be implemented, for example, using one or more VNFs deployed on and executed by one or more cloud worker nodes 222. For example, where the congestion-control techniques described here are implemented using a containerized environment, the cloud worker nodes 222 comprise respective clusters of physical worker nodes, the cloud native software 224 comprises a shared host operating system, and the virtualized entities 226 comprise one or more containers. In another example, where the congestion-control techniques described here are implemented at the hardware virtualization level, the cloud worker nodes 222 comprise respective clusters of physical worker nodes, the cloud native software 224 comprises a hypervisor (or similar software), and the virtualized entities 226 comprise virtual machines on which appropriate application software executes.

In the exemplary embodiment shown in FIG. 2, one cloud node is designated as the cloud "master" node 230. The cloud master node 230 can be a cloud node that is dedicated solely to serving as the cloud master node 230 (as shown in FIG. 2) or can be a cloud node that serves other roles as well (for example, that executes one or more virtualized entities 226 that implement portions of a CU 202 and/or a DU 204).

In the exemplary embodiment shown in FIG. 2, each DU 202, CU-CP 216, and CU-UP 218 is implemented as a respective virtualized software entity 226 that is executed in the scalable cloud environment 220 on one or more cloud worker nodes 222 under the control of the cloud master node 230 and the cloud native software 224 executing on each cloud worker node 222. In the following description, a cloud worker node 222 that implements at least a part of a CU 202 (for example, a CU-CP 216 and/or a CU-UP 218) is also referred to here as a "CU cloud worker node" 222, and a cloud worker node 222 that implements at least a part of a DU 202 is also referred to here as a "DU cloud worker node" 222.

In the exemplary embodiment shown in FIG. 2, the CU-CP 216, the CU-UP 218, and the DU 204 are each implemented as a single virtualized entity 226 executing on a different cloud worker node 222. However, it is to be understood that this is just one example and that different configurations and embodiments can be implemented in other ways. For example, the CU 202 can be implemented using multiple CU-UPs 218 using multiple virtualized entities 226 executing on one or more cloud worker nodes 222. In another example, multiple DUs 204 (using multiple virtualized entities 226 executing on one or more cloud worker nodes 222) can be used to serve a cell, where each of the multiple DUs 204 serves a different set of RUs 206. Moreover, it is to be understood that the CU 202 and DU 204 can be implemented in the same cloud (for example, together in an edge cloud 215). Other configurations and embodiments can be implemented in other ways.

Although FIG. 2 (and the description set forth here more generally) is described in the context of a 5G embodiment in which each base station is partitioned into a CU-CP 216, CU-UP 218, DUs 204, and RUs 206 and some physical-layer processing is performed in the DUs 204 with the remaining physical-layer processing being performed in the RUs 206, it is to be understood that the techniques described here can be used with other wireless interfaces (for example, 4G LTE) and with other ways of implementing a base station entity. Accordingly, references to a CU-CP, CU-UP, DU, or RU in this description and associated figures can also be considered to refer more generally to any entity (including, for example, any "base station" or "RAN" entity) implementing any of the functions or features described here as being implemented by a CU-CP, CU-UP, DU, or RU.

FIG. 3 comprises a high-level flowchart illustrating one exemplary embodiment of a method 300 of providing wireless service to user equipment using a scalable cloud environment where congestion conditions are addressed. The embodiment of method 300 shown in FIG. 3 is described here as being implemented using the distributed gNB 200 described above in connection with FIG. 2, though it is to be understood that other embodiments can be implemented in other ways.

The blocks of the flow diagram shown in FIG. 3 have been arranged in a generally sequential manner for ease of explanation; however, it is to be understood that this arrangement is merely exemplary, and it should be recognized that the processing associated with method 300 (and the blocks shown in FIG. 3) can occur in a different order (for example, where at least some of the processing associated with the blocks is performed in parallel and/or in an event-driven manner). Also, most standard exception handling is not described for ease of explanation; however, it is to be understood that method 300 can and typically would include such exception handling. Moreover, one or more aspects of method 300 can be configurable or adaptive (either manually or in an automated manner).

Method 300 comprises using a scalable cloud environment 220 to implement a plurality of virtualized entities 226 to implement at least a part of a base station (block 302). Generally, the virtualized entities 226 that the scalable cloud environment 220 is used to implement include a first virtualized entity 226 configured to perform first processing and a second virtualized entity configured to perform second processing, where the first processing generates data that is used by the second processing and that is communicated from the first virtualized entity 226 to the second virtualized entity 226.

The first virtualized entity 226 is also referred to here as a "source" virtualized entity 226, and the second virtualized entity 226 is also referred to here as a "sink" virtualized entity 226. That is, the first processing performed by the source virtualized entity 226 generates data that is used by the second processing performed by the sink virtualized entity 226. It is to be understood that a virtualized entity 226 may be sink virtualized entity 226 for some processing or contexts and a source virtualized entity 226 for some other processing or contexts. For example, in the context of receive (uplink) processing for the gNB 200 shown in FIG. 2, the user-plane processing performed by the one or more virtualized entities 226 implementing each DU 204 generates data that is used by the user-plane processing performed by the one or more virtualized entities 226 implementing a CU-UP 218, and the control-plane processing performed by the one or more virtualized entities 226 implementing each DU 204 generates data that is used by the control-plane processing performed by the one or more virtualized entities 226 implementing the CU-CP 216. Therefore, in the context of receive (uplink) processing for the gNB 200 shown in FIG. 2, the virtualized entities 226 implementing each DU 204 are "source" virtualized entities 226 and the virtualized entities 226 implementing each CU-UP 218 and CU-CP 216 are "sink" virtualized entities 226.

Likewise, in the context of transmit (downlink) processing for the gNB 200 shown in FIG. 2, the user-plane processing performed by the one or more virtualized entities 226 implementing each CU-UP 218 generates data that is used by the user-plane processing performed by the one or more virtualized entities 226 implementing a DU 204, and the control-plane processing performed by the one or more virtualized entities 226 implementing each CU-CP 216 generates data that is used by the control-plane processing performed by the one or more virtualized entities 226 implementing a DU 204. Therefore, in the context of receive (uplink) processing for the gNB 200 shown in FIG. 2, the virtualized entities 226 implementing each CU-UP 218 and CU-CP 216 are "source" virtualized entities 226, and the virtualized entities 226 implementing the DU 204 are "sink" virtualized entities 226

In this exemplary embodiment, the scalable cloud environment 220 comprises one or more cloud master nodes 230 and cloud worker nodes 222 that are configured to execute cloud native software 224. The cloud native software 224 is configured to execute and manage the one or more virtualized entities 226.

In the exemplary embodiment described here in connection with FIG. 3, a respective one or more virtualized entities 226 are used to implement each CU 202 and each DU 204 used to implement at least a part of a gNB 200. In the following description, a virtualized entity 226 used to implement a DU 204 is also described here as a "DU virtualized entity" 226 and a virtualized entity 226 used to implement a CU 202 is also described here as a "CU virtualized entity" 226. More specifically, a virtualized entity 226 used to implement a CU-CP 216 is also described here as a "CU-CP virtualized entity" 226, and a virtualized entity 226 used to implement a CU-UP 218 is also described here as a "CU-UP virtualized entity" 226.

Method 300 further comprises collecting, by cloud native software executing in the scalable cloud environment 220, metrics associated with implementing one or more of the sink virtualized entities 226 in the scalable cloud environment 220 (block 304). In this exemplary embodiment, these metrics are collected by the cloud native software 224 executing on each cloud worker node 222 that executes one or more sink virtualized entities 226.

As shown in FIG. 2, in this exemplary embodiment, the cloud native software 224 executing on each cloud worker node 222 used to implement a sink sink virtualized entity 226 includes a metrics agent 232. The metrics agent 232 is configured to collect and aggregate cloud-native metrics associated with executing each sink virtualized entity 226 on the respective cloud worker node 222. These cloud-native metrics are the general metrics that the cloud native software 224 is natively configured to determine. Examples of such cloud-native metrics include central processing unit (CPU), memory and swap usage and network throughput). Cloud-native metrics can be contrasted with application-specific metrics, which are metrics that are determined by the virtualized entity 226 at the application level. The metrics agent 232 is configured to include information that can be used to identify which sink virtualized entity 226 is experiencing the overload condition and, as described below, to determine by how much the associated source virtualized entity 226 should be throttled so as to alleviate that condition.

As shown in FIG. 3, method 300 further comprises determining when a congestion condition exists for a sink virtualized entity 226 based on the collected cloud-native metrics collected (block 306) and, in response to determining that such a congestion condition exists, causing a control action to be taken in order to throttle at least one source virtualized entity 226 sourcing data for the congested sink virtualized entity 226 (block 308). In general, the collected cloud-native metrics for each sink virtualized entity 226 are monitored and used to determine when a congestion condition exists for that sink virtualized entity 226 for which a control action should be taken. As shown in FIG. 2, in this exemplary embodiment, the cloud native software 224 executing on the cloud master node 230 includes an event handler 234 that is configured to cause a control action to be taken to attempt to address the identified congestion condition.

In this exemplary embodiment, the control action comprises throttling one or more source virtualized entities 226 sourcing input data for the one or more congested sink virtualized entities 226. The event handler 234 can cause a source virtualized entity 226 communicating input data to a sink virtualized entity 226 to throttle the processing performed by the source virtualized entity 226 by communicating with the associated cloud worker node 222. The event handler 234 communicates with the associated cloud worker node 222 over the network 228 and is configured to include information that can be used to identify which source virtualized entity 226 the control action should be taken for and by how much the source virtualized entity 226 should be throttled.

In the exemplary embodiment shown in FIG. 2, the cloud native software 224 executing on each cloud worker node 222 includes a throttle agent 236. The throttle agent 236 is configured to communicate, over the network 228, with the event handler 234 executing on the cloud master node 230 and to respond to communications from the event handler 234 that indicate that one or more source virtualized entities 226 should be throttled. The throttle agent 236 is configured so that when it receives a communication from the event handler 234 indicating that a source virtualized entity 226 should be throttled, it identifies the source virtualized entity 226 (using the identification information provided from the event handler 234) and then, in this exemplary embodiment, sets an environment variable 235 in the operating system context in which the source virtualized entity 226 is executing. Each source virtualized entity 226 is configured to periodically check the respective environment variables 235 associated with it and respond accordingly to any changes in the values of those environment variables 235. For example, the value stored in each such environment variable 235 can indicate a "throttle value," ranging from 0 (associated with no throttling) to a predetermined maximum throttle value (associated with the maximum amount of throttling that can be performed).

The cloud-native metrics collected by the metrics agent 232 executing on each cloud worker node 222 can be monitored and acted on in different ways. For example, in a first configuration, each metrics agent 232 periodically communicates, to the cloud master node 230, the most-recent cloud-native metrics for each associated sink virtualized entity 226 for monitoring by the cloud master node 230. In the exemplary embodiment shown in FIG. 2, the cloud native software 224 executing on the cloud master node 230 includes a metric collector 238 that is configured to receive the cloud-native metrics periodically communicated to the cloud master node 230 by each metrics agent 232. The metrics collector 238 is configured to monitor the received cloud-native metrics for each sink virtualized entity 226 and use it to determine when a congestion condition exists for which a control action should be taken. The metrics collector 238 is configured so that, when it determines that a congestion condition exists for a given sink virtualized entity 226, the metrics collector 238 instructs the event handler 234 executing on the cloud master node 230 to cause a control action to be taken to attempt to address the identified congestion condition as described above.

In a second configuration shown in FIG. 2, the cloud native software 224 executing on the cloud master node 230 includes a probe agent 240. The probe agent 240 is configured to retrieve cloud-native metrics for any sink virtualized entity 226 that are collected by the respective metrics agent 232 running on the associated cloud worker node 222. That is, the probe agent 240 is configured to send a request message to the relevant cloud worker node 222. Each such request message identifies a sink virtualized entity 226 for which the probe agent 240 is requesting one or more cloud-native metrics. The metrics agent 232 executing on that worker node 222 responds to such a request message by sending to the probe agent 240 (and the cloud master node 230) one or more response messages that include the requested cloud-native metrics for the identified sink virtualized entity 226. The probe agent 240 receives and aggregates the cloud-native metrics included in the response messages. The probe agent 240 also monitors the collected cloud-native metrics and determines when a congestion condition exists for a given sink virtualized entity 226 for which a control action should be taken. When a control action should be taken to address a control action, the probe agent 240 instructs the event handler 234 to cause a control action to be taken to address the congestion condition in the manner described above.

In a third configuration, the monitoring of the collected cloud-native metrics is done at each cloud worker node 222. In the exemplary embodiment shown in FIG. 2, the cloud native software 224 executing on each cloud worker node 222 includes an alarm agent 242. Each alarm agent 242 is configured to access the cloud-native metrics collected by the metrics agent 232 running on that cloud worker node 222 and locally monitor the collected cloud-native metrics for each associated sink virtualized entity 226 and determine when a congestion condition exists for it. Each alarm agent 242 is configured to send an alarm message to the cloud master node 230 via the network 228 when it determines that such a congestion condition exists. The alarm message includes information indicating that a congestion condition exists and information identifying the associated sink virtualized entity 226 for which the congestion condition exists and for which the alarm message is being sent. When the cloud master node 230 receives an alarm message from a cloud worker node 222, it is processed by the event handler 234 executing on the cloud master node 230. The event handler 234 is configured to cause a control action to be taken to address the congestion condition identified in the alarm message in the manner described above.

By using cloud-native metrics collected at the cloud worker nodes 222, congestion conditions that occur at sink virtualized entities 226 implementing a base station can be detected and addressed by throttling the processing for corresponding one or more source virtualized entities 226 providing input data to each sink virtualized entity 226 in a way that does not require an additional standardized functional interface and protocol to be specified between each entity for congestion control. Instead, functionality that is already implemented in cloud-native software 224 running on worker nodes 222 deployed in a scalable cloud environment 220 can be used to capture metrics that are indicative of a congestion condition of at a sink virtualized entity 226. This solution is especially well-suited for use in multi-vendor environments.

Method 300 can be used with implementing both the receive (uplink) signal processing for the gNB 200 and the transmit (downlink) signal processing for the gNB 200.

FIGS. 4-9 illustrate the operation of the three configurations noted above in the context of implementing the receive (uplink) signal processing for the gNB 200 shown in FIG. 2 where the CU virtualized entities 226 are the sink virtualized entities 226 and the DU virtualized entities 226 are the source virtualized entities 226. For the receive signal processing, there are two separate environment variables 235 associated with each DU virtualized entity 226—one for throttling the control-plane processing performed by that DU virtualized entity 226 and one for throttling the user-plane processing performed by that DU virtualized entity 226.

FIG. 4 is a sequence diagram illustrating the operation of the exemplary embodiment shown in FIG. 2 for the first configuration described above (that is, the configuration in which the metrics collector 238 is used) in the case of a congestion condition existing at a CU-UP 218. In the example shown in FIG. 4, a DU 204 implemented by a DU virtualized entity 226 executing on a DU worker node 222 generates an amount of uplink user-plane traffic 402 that generates a congestion condition 404 at the CU-UP 218 serving that DU 204 (that is, at the CU-UP virtualized entity 226 that is executed at the CU-UP worker node 222 that implements the CU-UP 218). The metrics agent 232 executing on the CU-UP worker node 222 that implements the CU-UP 218 collects 406 cloud-native metrics associated with executing the CU-UP virtualized entity 226 on the CU-UP cloud worker node 222. The metric agent 232 periodically communicates 408 the collected cloud-native metrics to the metrics collector 238 executing on the cloud master node 230. The metrics collector 238 monitors the cloud-native metrics for that CU-UP virtualized entity 226 and, as a result, will determine that the congestion condition 404 exists at the CU-UP 218 and will instruct 410 the event handler 234 executing on the cloud master node 230 to take a control action for the congestion condition 404.

When the event handler 234 is notified of the congestion condition 404 and that a control action 420 should be taken for it, the event handler 234 sends a message 422 to the throttle agent 236 executing on the DU worker node 222 executing the DU virtualized entity 226 implementing the DU 204, the message 422 indicating that the uplink user-plane processing for that DU 204 should be throttled. In response to receiving the message 422, the throttle agent 236 sets 424 and 426 the user-plane environment variable 235 in the operating system context in which the DU virtualized entity 226 is executing to a value that throttles the user-plane processing of the DU 204. The DU 204 is configured to periodically check 428 the respective user-plane and control-plane environment variables 235 associated with it and responds to the change in the value stored in the user-plane environment variable 235 by throttling 430 the user-plane processing of the DU virtualized entity 226, which should reduce or alleviate the congestion condition 404.

For example, the value stored in the user-plane environment variable 235 can be used, for example, by the DU 204 to determine a maximum number of resource blocks (RBs) that can be scheduled for transmission on the physical uplink shared channel (PUSCH) during any given time transmission interval (TTI). In such an example, the DU 204 can be throttled by reducing the maximum number PUSCH RBs that can be scheduled, which will result in a reduction in the amount user-plane traffic that the associated CU-UPs 218 will need to process and, as a result, will reduce the congestion condition that prompted the throttling. The throttling can be performed in other ways.

FIG. 5 is a sequence diagram illustrating the operation of the exemplary embodiment shown in FIG. 2 for the second configuration described above (that is, the configuration in which the probe agent 240 is used) in the case of a congestion condition existing at a CU-UP 218. Except as set forth below in connection with FIG. 5, the description set forth above in connection with FIG. 4 applies to the example shown in FIG. 5 and is not repeated below for the sake of brevity. In the example shown in FIG. 5, the probe agent 240 is configured to retrieve 416 cloud-native metrics for the CU-UP virtualized entity 226 collected by the metrics agent 232 running on the CU cloud worker node 222. The probe agent 240 monitors the retrieved cloud-native metrics for that CU-UP virtualized entity 226 and, as a result, will determine that the congestion condition exists 404 at the CU-UP 218 and will instruct 418 the event handler 234 executing on the cloud master node 230 to take a control action for the congestion condition 404. In response, the event handler 234 will take a control action for the congestion condition 404 as described above in connection with FIG. 4.

FIG. 6 is a sequence diagram illustrating the operation of the exemplary embodiment shown in FIG. 2 for the third configuration described above (that is, the configuration in which the alarm agent 242 is used) in the case of a congestion condition existing at a CU-UP 218. Except as set forth below in connection with FIG. 6, the description set forth above in connection with FIG. 4 applies to the example shown in FIG. 6 and is not repeated below for the sake of brevity. In the example shown in FIG. 6, the alarm agent 242 executing on the CU-UP cloud worker node 222 receives 412 the cloud-native metrics collected by the metrics agent 232. The alarm agent 242 monitors the cloud-native metrics for that CU-UP virtualized entity 226 and, as a result, will determine that the congestion condition 404 exists at the CU-UP 218 and will send an alarm message 414 to the event handler 242, where the alarm message 414 indicates that a congestion condition 404 exists at the CU-UP 218 and identifies the CU-UP virtualized entity 226 for which a control action should be taken. In response to receiving the alarm message 414, the event handler 234 will take a control action for the congestion condition 404 as described above in connection with FIG. 4.

FIG. 7 is a sequence diagram illustrating the operation of the exemplary embodiment shown in FIG. 2 for the first configuration described above (that is, the configuration in which the metrics collector 238 is used) in the case of a congestion condition existing at a CU-CP 216. In the example shown in FIG. 7, a DU 204 implemented by a DU virtualized entity 226 executing on a DU worker node 222 generates an amount of uplink control-plane traffic 702 that generates a congestion condition 704 at the CU-CP 216 serving that DU 204 (more specifically, at the CU-CP virtualized entity 226 that is executed at the CU-CP worker node 222 that implements the CU-CP 216). The metrics agent 232 executing on the CU-CP worker node 222 that implements the CU-CP 216 collects 706 cloud-native metrics associated with executing the CU-CP virtualized entity 226 on the CU-CP cloud worker node 222. The metric agent 232 periodically communicates 708 the collected cloud-native metrics to the metrics collector 238 executing on the cloud master node 230. The metrics collector 238 monitors the cloud-native metrics for that CU-CP virtualized entity 226 and, as a result, will determine that the congestion condition 704 exists at the CU-CP 216 and will instruct 710 the event handler 234 executing on the cloud master node 230 to take a control action for the congestion condition 704.

When the event handler 234 is notified of the congestion condition 704 and that a control action 720 should be taken for it, the event handler 234 sends a message 722 to the throttle agent 236 executing on the DU worker node 222 executing the DU virtualized entity 226 implementing the DU 204, the message 722 indicating that the uplink control-plane processing for that DU 204 should be throttled. In response to receiving the message 722, the throttle agent 236 sets 724 and 726 the control-plane environment variable 235 in the operating system context in which the DU virtualized entity 226 is executing to a value that throttles the control-plane processing of the DU 204. The DU 204 is configured to periodically check 728 the respective user-plane and control-plane environment variables 235 associated with it and responds to the change in the value stored in the control-plane environment variable 235 by throttling 730 the control-plane processing of the DU virtualized entity 226, which should reduce or alleviate the congestion condition 704.

For example, the value stored in the control-plane environment variable 235 can be used, for example, by the DU 204 to determine a maximum connection setup rate that the DU 204 will enforce. In such an example, the DU 204 can be throttled by reducing the maximum connection setup rate, which will result in a reduction in the amount control-plane traffic that the associated CU-CP 216 will need to process and, as a result, will reduce the congestion condition that prompted the throttling.

FIG. 8 is a sequence diagram illustrating the operation of the exemplary embodiment shown in FIG. 2 for the second configuration described above (that is, the configuration in which the probe agent 240 is used) in the case of a congestion condition existing at a CU-CP 216. Except as set forth below in connection with FIG. 8, the description set forth above in connection with FIG. 7 applies to the example shown in FIG. 8 and is not repeated below for the sake of brevity. In the example shown in FIG. 8, the gNB 200 is configured to use the second configuration described above (that is, the configuration in which the probe agent 240 is used). The probe agent 240 is configured to retrieve 716 cloud-native metrics for the CU-CP virtualized entity 226 collected by the metrics agent 232 running on the CU cloud worker node 222. The probe agent 240 monitors the retrieved cloud-native metrics for that CU-CP virtualized entity 226 and, as a result, will determine that the congestion condition 704 exists at the CU-CP 216 and will instruct 718 the event handler 234 executing on the cloud master node 230 to take a control action for the congestion condition 704. In response, the event handler 234 will take a control action for the congestion condition 704 as described above in connection with FIG. 7.

FIG. 9 is a sequence diagram illustrating the operation of the exemplary embodiment shown in FIG. 2 for the third configuration described above (that is, the configuration in which the alarm agent 242 is used) in the case of a congestion condition existing at a CU-CP 216. Except as set forth below in connection with FIG. 9, the description set forth above in connection with FIG. 7 applies to the example shown in FIG. 9 and is not repeated below for the sake of brevity. In the example shown in FIG. 9, the alarm agent 242 executing on the CU-CP cloud worker node 222 receives 712 the cloud-native metrics collected by the metrics agent 232. The alarm agent 242 monitors the cloud-native metrics for that CU-CP virtualized entity 226 and, as a result, will determine that the congestion condition 704 exists at the CU-CP 216 and will send an alarm message 714 to the event handler 242, where the alarm message 714 indicates that a congestion condition 704 exists at the CU-CP 216 and identifies the CU-CP virtualized entity 226 for which a control action should be taken. In response to receiving the alarm message 714, the event handler 234 will take a control action for the congestion condition 704 as described above in connection with FIG. 7.

As noted above, method 300 can be used with implementing the transmit (downlink) signal processing for the gNB 200. FIGS. 10-15 illustrate the operation of the three configurations noted above in the context of implementing the transmit (downlink) signal processing for the gNB 200 shown in FIG. 2 where the DU virtualized entities 226 are the sink virtualized entities 226 and the CU virtualized entities 226 are the source virtualized entities 226. For the transmit signal processing, there is an environment variable 235 associated with each CU-CP virtualized entity 226 for throttling the control-plane processing performed by that CU-CP virtualized entity 226 and there is an environment variable 235 associated with each CU-UP virtualized entity 226 for throttling the user-plane processing performed by that CU-UP virtualized entity 226.

FIG. 10 is a sequence diagram illustrating the operation of the exemplary embodiment shown in FIG. 2 for the first configuration described above (that is, the configuration in which the metrics collector 238 is used) in the case of a congestion condition existing at a DU 204 in connection with the user-plane processing it performs. In the example shown in FIG. 10, a CU-UP 218 implemented by a CU-UP virtualized entity 226 executing on a CU worker node 222 generates an amount of downlink user-plane traffic 1002 that generates a congestion condition 1004 at the DU 204 serving that CU-UP 218 (that is, at the DU virtualized entity 226 that is executed at the DU worker node 222 that implements the DU 204). The metrics agent 232 executing on the DU worker node 222 that implements the DU 204 collects 1006 cloud-native metrics associated with executing the DU virtualized entity 226 on the DU cloud worker node 222. The metric agent 232 periodically communicates 1008 the collected cloud-native metrics to the metrics collector 238 executing on the cloud master node 230. The metrics collector 238 monitors the cloud-native metrics for that DU virtualized entity 226 and, as a result, will determine that the congestion condition 1004 exists at the DU 204 in connection with the user-plane processing it performs and will instruct 1010 the event handler 234 executing on the cloud master node 230 to take a control action for the congestion condition 1004.

When the event handler 234 is notified of the congestion condition 1004 and that a control action 1020 should be taken for it, the event handler 234 sends a message 1022 to the throttle agent 236 executing on the CU-UP worker node 222 executing the CU-UP virtualized entity 226 implementing the CU-UP 218, the message 1022 indicating that the downlink user-plane processing for that CU-UP 218 should be throttled. In response to receiving the message 1022, the throttle agent 236 sets 1024 and 1026 the user-plane environment variable 235 in the operating system context in which the CU-UP virtualized entity 226 is executing to a value that throttles the user-plane processing of the CU-UP 218. The CU-UP 218 is configured to periodically check 1028 the respective user-plane environment variable 235 associated with it and responds to the change in the value stored in the user-plane environment variable 235 by throttling 1030 the user-plane processing of the CU-UP virtualized entity 226, which should reduce or alleviate the congestion condition 1004.

FIG. 11 is a sequence diagram illustrating the operation of the exemplary embodiment shown in FIG. 2 for the second configuration described above (that is, the configuration in which the probe agent 240 is used) in the case of a congestion condition existing at a DU 204 in connection with the user-plane processing it performs. Except as set forth below in connection with FIG. 11, the description set forth above in connection with FIG. 10 applies to the example shown in FIG. 11 and is not repeated below for the sake of brevity. In the example shown in FIG. 11, the probe agent 240 is configured to retrieve 1016 cloud-native metrics for the DU virtualized entity 226 collected by the metrics agent 232 running on the DU cloud worker node 222. The probe agent 240 monitors the retrieved cloud-native metrics for that DU virtualized entity 226 and, as a result, will determine that the congestion condition exists 1004 at the DU 204 in connection with the user-plane processing and will instruct 1018 the event handler 234 executing on the cloud master node 230 to take a control action for the congestion condition 1004. In response, the event handler 234 will take a control action for the congestion condition 1004 as described above in connection with FIG. 10.

FIG. 12 is a sequence diagram illustrating the operation of the exemplary embodiment shown in FIG. 2 for the third configuration described above (that is, the configuration in which the alarm agent 242 is used) in the case of a congestion condition existing at a DU 204 in connection with the user-plane processing it performs. Except as set forth below in connection with FIG. 12, the description set forth above in connection with FIG. 10 applies to the example shown in FIG. 12 and is not repeated below for the sake of brevity. In the example shown in FIG. 12, the alarm agent 242 executing on the DU cloud worker node 222 receives 1012 the cloud-native metrics collected by the metrics agent 232. The alarm agent 242 monitors the cloud-native metrics for that DU virtualized entity 226 and, as a result, will determine that the congestion condition 1004 exists at the DU 204 and will send an alarm message 1014 to the event handler 242, where the alarm message 1014 indicates that a congestion condition 1004 exists at the DU 204 for the user-plane processing it performs and identifies the DU virtualized entity 226 for which a control action should be taken. In response to receiving the alarm message 1014, the event handler 234 will take a control action for the congestion condition 1004 as described above in connection with FIG. 10.

FIG. 13 is a sequence diagram illustrating the operation of the exemplary embodiment shown in FIG. 2 for the first configuration described above (that is, the configuration in which the metrics collector 238 is used) in the case of a congestion condition existing at a DU 204 in connection with the control-plane processing it performs. In the example shown in FIG. 13, a CU-CP 216 implemented by a CU-CP virtualized entity 226 executing on a CU-CP worker node 222 generates an amount of downlink control-plane traffic 1302 that generates a congestion condition 1304 at the DU 204 serving that CU-CP 216 (more specifically, at the DU virtualized entity 226 that is executed at the DU worker node 222 that implements the DU 204). The metrics agent 232 executing on the DU worker node 222 that implements the DU 204 collects 1306 cloud-native metrics associated with executing the DU virtualized entity 226 on the DU cloud worker node 222. The metric agent 232 periodically communicates 1308 the collected cloud-native metrics to the metrics collector 238 executing on the cloud master node 230. The metrics collector 238 monitors the cloud-native metrics for that DU virtualized entity 226 and, as a result, will determine that the congestion condition 1304 exists at the DU 204 in connection with the control-plane processing it performs and will instruct 1310 the event handler 234 executing on the cloud master node 230 to take a control action for the congestion condition 1304.

When the event handler 234 is notified of the congestion condition 1304 and that a control action 1320 should be taken for it, the event handler 234 sends a message 1322 to the throttle agent 236 executing on the CU-CP worker node 222 executing the CU-CP virtualized entity 226 implementing the CU-CP 216, the message 1322 indicating that the downlink control-plane processing for that CU-CP 216 should be throttled. In response to receiving the message 1322, the throttle agent 236 sets 1324 and 1326 the corresponding environment variable 235 in the operating system context in which the CU-CP virtualized entity 226 is executing to a value that throttles the control-plane processing of the CU-CP 216. The CU-CP 216 is configured to periodically check 1328 the respective environment variable 235 associated with it and responds to the change in the value stored in the environment variable 235 by throttling 1330 the control-plane processing of the CU-CP virtualized entity 226, which should reduce or alleviate the congestion condition.

FIG. 14 is a sequence diagram illustrating the operation of the exemplary embodiment shown in FIG. 2 for the second configuration described above (that is, the configuration in which the probe agent 240 is used) in the case of a congestion condition existing at a DU 204 in connection with the control-plane processing it performs. Except as set forth below in connection with FIG. 14, the description set forth above in connection with FIG. 14 applies to the example shown in FIG. 14 and is not repeated below for the sake of brevity. In the example shown in FIG. 14, the gNB 200 is configured to use the second configuration described above (that is, the configuration in which the probe agent 240 is used). The probe agent 240 is configured to retrieve 1316 cloud-native metrics for the DU virtualized entity 226 collected by the metrics agent 232 running on the DU cloud worker node 222. The probe agent 240 monitors the retrieved cloud-native metrics for that DU virtualized entity 226 and, as a result, will determine that the congestion condition 1304 exists at the DU 204 in connection with the control-plane processing it performs and will instruct 1318 the event handler 234 executing on the cloud master node 230 to take a control action for the congestion condition 1304. In response, the event handler 234 will take a control action for the congestion condition 1304 as described above in connection with FIG. 13.

FIG. 15 is a sequence diagram illustrating the operation of the exemplary embodiment shown in FIG. 2 for the third configuration described above (that is, the configuration in which the alarm agent 242 is used) in the case of a congestion condition existing at a DU 204 in connection with the control-plane processing it performs. Except as set forth below in connection with FIG. 15, the description set forth above in connection with FIG. 13 applies to the example shown in FIG. 15 and is not repeated below for the sake of brevity. In the example shown in FIG. 15, the alarm agent 242 executing on the DU cloud worker node 222 receives 1312 the cloud-native metrics collected by the metrics agent 232. The alarm agent 242 monitors the cloud-native metrics for that DU virtualized entity 226 and, as a result, will determine that the congestion condition 1304 exists at the DU 204 in connection with the control-plane processing it performs and will send an alarm message 1314 to the event handler 242, where the alarm message 1314 indicates that a congestion condition 1304 exists at the DU 204 in connection with the control-plane processing it performs and identifies the DU virtualized entity 226 for which a control action should be taken. In response to receiving the alarm message 1314, the event handler 234 will take a control action for the congestion condition 1304 as described above in connection with FIG. 13.

Other embodiments are implemented in other ways.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

EXAMPLE EMBODIMENTS

Example 1 includes a system to provide wireless service to user equipment, the system comprising: a scalable cloud environment configured to implement a plurality of virtualized entities that implement a part of a base station to provide the wireless service to the user equipment; wherein the plurality of virtualized entities comprises: a first virtualized entity configured to perform first processing associated with providing the wireless service to the user equipment; and a second virtualized entity configured to perform second processing associated with providing the wireless service to the user equipment, wherein the first processing generates data that is used by the second processing and that is communicated from the first virtualized entity to the second virtualized entity; wherein the scalable cloud environment comprises cloud native software that is configured to collect cloud-native metrics associated with implementing the second virtualized entity in the scalable cloud environment; wherein the system is configured to determine when a congestion condition exists for the second virtualized entity based on the cloud-native metrics collected for the second virtualized entity; and wherein the system is configured to, in response to determining that the congestion condition exists for the second virtualized entity, cause a control action to be taken in order to throttle the first virtualized entity.

Example 2 includes the system of Example 1, wherein the plurality of virtualized entities comprises a plurality of first virtualized entities configured to perform the first processing.

Example 3 includes the system of any of Examples 1-2, wherein the first virtualized entity comprises a distributed unit (DU) entity configured to implement at least some Layer-2 functions for the base station; and wherein the second virtualized entity comprises a central unit (CU) entity configured to implement at least some Layer-3 functions for the base station and at least some Layer-2 functions for the base station.

Example 4 includes the system of Example 3, wherein the CU entity comprises one of: a central unit user-plane (CU-UP) entity configured to implement at least some user-plane Layer-3 functions for the base station and at least some user-plane Layer-2 functions for the base station; and a central unit control-plane (CU-CP) entity configured to implement at least some control-plane Layer-3 functions for the base station and at least some control-plane Layer-2 functions for the base station.

Example 5 includes the system of any of Examples 3-4, wherein the base station comprises one or more remote units (RU), each RU is communicatively coupled to the DU entity and is associated with a respective set of one or more antennas via which downlink radio frequency signals are radiated to at least some of the user equipment and via which uplink radio frequency signals transmitted by at least some of the user equipment are received, wherein each RU is configured to implement at least some Layer-1 functions for the base station and radio frequency (RF) functions for the base station.

Example 6 includes the system of Example 5, wherein the DU entity is configured to perform at least some Layer-1 functions for the base station.

Example 7 includes the system of any of Examples 1-6, wherein the first virtualized entity comprises a central unit (CU) entity configured to implement at least some Layer-3 functions for the base station and at least some Layer-2 functions for the base station; and wherein the second virtualized entity comprises a distributed unit (DU) entity configured to implement at least some Layer-2 functions for the base station.

Example 8 includes the system of Example 7, wherein the CU entity comprises one of: a central unit user-plane (CU-UP) entity configured to implement at least some user-plane Layer-3 functions for the base station and at least some user-plane Layer-2 functions for the base station; and a central unit control-plane (CU-CP) entity configured to implement at least some control-plane Layer-3 functions for the base station and at least some control-plane Layer-2 functions for the base station.

Example 9 includes the system of Example 8, wherein the base station comprises one or more remote units (RU), each RU is communicatively coupled to the DU entity and is associated with a respective set of one or more antennas via which downlink radio frequency signals are radiated to at least some of the user equipment and via which uplink radio frequency signals transmitted by at least some of the user equipment are received, wherein each RU is configured to implement at least some Layer-1 functions for the base station and radio frequency (RF) functions for the base station.

Example 10 includes the system of Example 9, wherein the DU entity is configured to perform at least some Layer-1 functions for the base station.

Example 11 includes the system of any of Examples 1-10, wherein the scalable cloud environment comprises one or more cloud worker nodes that are configured to execute respective cloud native software that is configured to execute and manage the first and second virtualized entities.

Example 12 includes the system of Example 11, wherein the cloud native software executing on each cloud worker node that executes the second virtualized entity is configured to collect the cloud-native metrics associated with executing the second virtualized entity on said cloud worker node.

Example 13 includes the system of any of Examples 11-12, wherein the scalable cloud environment comprises a cloud master node configured to execute software, the software executing on the cloud master node includes an event handler that is configured to cause the control action to be taken in order to throttle the first virtualized entity when the congestion condition exists for the second virtualized entity based on the cloud-native metrics collected for the second virtualized entity.

Example 14 includes the system of Example 13, wherein the software executing on the cloud master node includes a metrics collector that is configured to receive the cloud-native metrics collected for the second virtualized entity and determine when the congestion condition exists for the second virtualized entity based on the cloud-native metrics collected for the second virtualized entity.

Example 15 includes the system of any of Examples 13-14, wherein the software executing on the cloud master node comprises a probe agent configured request at least some cloud-native metrics collected for the second virtualized entity, receive the requested cloud-native metrics collected for the second virtualized entity, and determine when the congestion condition exists for the second virtualized entity based on the received cloud-native metrics collected for the second virtualized entity, wherein the probe agent is configured to instruct the event handler to cause the control action to be taken in response to determining that the congestion condition exists.

Example 16 includes the system of any of Examples 11-15, wherein the cloud native software executing on each cloud worker node that executes the second virtualized entity comprises a metrics agent configured to collect the cloud-native metrics associated with executing the second virtualized entity on said cloud worker node.

Example 17 includes the system of any of Examples 11-16, wherein the cloud native software executing on each cloud worker node that executes the second virtualized entity comprises an alarm agent configured determine when the congestion condition exists for the second virtualized entity based on the cloud-native metrics collected for the second virtualized entity, wherein the alarm agent is configured to instruct the event handler to cause the control action to be taken in response to determining that the congestion condition exists.

Example 18 includes the system of any of Examples 11-17, wherein the cloud native software executing on each cloud worker node that executes the first virtualized entity comprises a throttle agent that is configured to throttle the first virtualized entity.

Example 19 includes the system of Example 18, wherein the throttle agent included in the cloud native software executing on each cloud worker node that executes the first virtualized entity is configured to throttle the first virtualized entity by storing a throttle value in a respective environment variable for the first virtualized entity, each throttle value indicative of an amount of throttling to be performed for the first virtualized entity; and wherein the first virtualized entity is configured to check the respective throttle value stored in the respective environment variable for the first virtualized entity and perform the amount of throttling indicated thereby for the first virtualized entity.

Example 20 includes the system of any of Examples 1-19, wherein the scalable cloud environment comprises a distributed scalable cloud environment.

Example 21 includes the system of any of Examples 1-20, wherein the distributed scalable cloud environment comprises at least one central cloud and at least one edge cloud.

Example 22 includes a method of providing wireless service to user equipment, the method comprising: using a scalable cloud environment configured to implement a plurality of virtualized entities that implement a part of a base station to provide the wireless service to the user equipment, wherein the plurality of virtualized entities comprises: a first virtualized entity configured to perform first processing associated with providing the wireless service to the user equipment; and a second virtualized entity configured to perform second processing associated with providing the wireless service to the user equipment, wherein the first processing generates data that is used by the second processing and that is communicated from the first virtualized entity to the second virtualized entity; collecting, using cloud native software included in the scalable cloud environment, metrics associated with implementing the second virtualized entity in the scalable cloud environment; and determining when a congestion condition exists for the second virtualized entity based on the cloud-native metrics collected for the second virtualized entity; and in response to determining that the congestion condition exists for the second virtualized entity, causing a control action to be taken in order to throttle the first virtualized entity.

Example 23 includes the method of Example 22, wherein the plurality of virtualized entities comprises a plurality of first virtualized entities configured to perform the first processing.

Example 24 includes the method of any of Examples 22-23, wherein the first virtualized entity comprises a distributed unit (DU) entity configured to implement at least some Layer-2 functions for the base station; and wherein the second virtualized entity comprises a central unit (CU) entity configured to implement at least some Layer-3 functions for the base station and at least some Layer-2 functions for the base station.

Example 25 includes the method of Example 24, wherein the CU entity comprises one of: a central unit user-plane (CU-UP) entity configured to implement at least some user-plane Layer-3 functions for the base station and at least some user-plane Layer-2 functions for the base station; and a central unit control-plane (CU-CP) entity configured to implement at least some control-plane Layer-3 functions for the base station and at least some control-plane Layer-2 functions for the base station.

Example 26 includes the method of any of Examples 24-25, wherein the base station comprises one or more remote units (RU), each RU is communicatively coupled to the DU entity and is associated with a respective set of one or more antennas via which downlink radio frequency signals are radiated to at least some of the user equipment and via which uplink radio frequency signals transmitted by at least some of the user equipment are received, wherein each RU is configured to implement at least some Layer-1 functions for the base station and radio frequency (RF) functions for the base station.

Example 27 includes the method of Example 26, wherein the DU entity is configured to perform at least some Layer-1 functions for the base station.

Example 28 includes the method of any of Examples 22-27, wherein the first virtualized entity comprises a central unit (CU) entity configured to implement at least some Layer-3 functions for the base station and at least some Layer-2 functions for the base station; and wherein the second virtualized entity comprises a distributed unit (DU) entity configured to implement at least some Layer-2 functions for the base station.

Example 29 includes the method of Example 28, wherein the CU entity comprises one of: a central unit user-plane (CU-UP) entity configured to implement at least some user-plane Layer-3 functions for the base station and at least some user-plane Layer-2 functions for the base station; and a central unit control-plane (CU-CP) entity configured to implement at least some control-plane Layer-3 functions for the base station and at least some control-plane Layer-2 functions for the base station.

Example 30 includes the method of Example 29, wherein the base station comprises one or more remote units (RU), each RU is communicatively coupled to the DU entity and is associated with a respective set of one or more antennas via which downlink radio frequency signals are radiated to at least some of the user equipment and via which uplink radio frequency signals transmitted by at least some of the user equipment are received, wherein each RU is configured to implement at least some Layer-1 functions for the base station and radio frequency (RF) functions for the base station.

Example 31 includes the method of Example 30, wherein the DU entity is configured to perform at least some Layer-1 functions for the base station.

Example 32 includes the method of any of Examples 22-31, wherein the scalable cloud environment comprises one or more cloud worker nodes that are configured to execute respective cloud native software that is configured to execute and manage the first and second virtualized entities.

Example 33 includes the method of Example 32, wherein the cloud native software executing on each cloud worker node that executes the second virtualized entity is configured to collect the cloud-native metrics associated with executing the second virtualized entity on said cloud worker node.

Example 34 includes the method of any of Examples 32-33, wherein the scalable cloud environment comprises a cloud master node configured to execute software, the software executing on the cloud master node includes an event handler that is configured to cause the control action to be taken in order to throttle the first virtualized entity when the congestion condition exists for the second virtualized entity based on the cloud-native metrics collected for the second virtualized entity.

Example 35 includes the method of Example 34, wherein the software executing on the cloud master node includes a metrics collector that is configured to receive the cloud-native metrics collected for the second virtualized entity and determine when the congestion condition exists for the second virtualized entity based on the cloud-native metrics collected for the second virtualized entity.

Example 36 includes the method of any of Examples 34-35, wherein the software executing on the cloud master node comprises a probe agent configured request at least some cloud-native metrics collected for the second virtualized entity, receive the requested cloud-native metrics collected for the second virtualized entity, and determine when the congestion condition exists for the second virtualized entity based on the received cloud-native metrics collected for the second virtualized entity, wherein the probe agent is configured to instruct the event handler to cause the control action to be taken in response to determining that the congestion condition exists.

Example 37 includes the method of any of Examples 32-36, wherein the cloud native software executing on each cloud worker node that executes the second virtualized entity comprises a metrics agent configured to collect the cloud-native metrics associated with executing the second virtualized entity on said cloud worker node.

Example 38 includes the method of any of Examples 32-37, wherein the cloud native software executing on each cloud worker node that executes the second virtualized entity comprises an alarm agent configured determine when the congestion condition exists for the second virtualized entity based on the cloud-native metrics collected for the second virtualized entity, wherein the alarm agent is configured to instruct the event handler to cause the control action to be taken in response to determining that the congestion condition exists.

Example 39 includes the method of any of Examples 32-38, wherein the cloud native software executing on each cloud worker node that executes the first virtualized entity comprises a throttle agent that is configured to throttle the first virtualized entity.

Example 40 includes the method of Example 39, wherein the throttle agent included in the cloud native software executing on each cloud worker node that executes the first virtualized entity is configured to throttle the first virtualized entity by storing a throttle value in a respective environment variable for the first virtualized entity, each throttle value indicative of an amount of throttling to be performed for the first virtualized entity; and wherein the first virtualized entity is configured to check the respective throttle value stored in the respective environment variable for the first virtualized entity and perform the amount of throttling indicated thereby for the first virtualized entity.

Example 41 includes the method of any of Examples 22-40, wherein the scalable cloud environment comprises a distributed scalable cloud environment.

Example 42 includes the method of any of Examples 22-41, wherein the distributed scalable cloud environment comprises at least one central cloud and at least one edge cloud.

What is claimed is:

1. A system to provide wireless service to user equipment, the system comprising:

a scalable cloud environment configured to implement a plurality of virtualized entities that implement a part of a base station to provide the wireless service to the user equipment;

wherein the plurality of virtualized entities comprises:

a first virtualized entity configured to perform first processing associated with providing the wireless service to the user equipment; and a second virtualized entity configured to perform second processing associated with providing the wireless service to the user equipment, wherein the first processing generates data that is used by the second processing and that is communicated from the first virtualized entity to the second virtualized entity;

wherein the scalable cloud environment comprises cloud native software that is configured to collect cloud-native metrics associated with implementing the second virtualized entity in the scalable cloud environment;

wherein the system is configured to determine when a congestion condition exists for the second virtualized entity based on the cloud-native metrics collected for the second virtualized entity; and wherein the system is configured to, in response to determining that the congestion condition exists for the second virtualized entity, cause a control action to be taken in order to throttle the first virtualized entity.

2. The system of claim 1, wherein the first virtualized entity comprises a distributed unit (DU) entity configured to implement at least some Layer-2 functions for the base station; and wherein the second virtualized entity comprises a central unit (CU) entity configured to implement at least some Layer-3 functions for the base station and at least some Layer-2 functions for the base station.

3. The system of claim 1, wherein the first virtualized entity comprises a central unit (CU) entity configured to implement at least some Layer-3 functions for the base station and at least some Layer-2 functions for the base station; and wherein the second virtualized entity comprises a distributed unit (DU) entity configured to implement at least some Layer-2 functions for the base station.

4. The system of claim 1, wherein the scalable cloud environment comprises one or more cloud worker nodes that are configured to execute respective cloud native software that is configured to execute and manage the first and second virtualized entities.

5. The system of claim 4, wherein the cloud native software executing on each cloud worker node that executes the second virtualized entity is configured to collect the cloud-native metrics associated with executing the second virtualized entity on said cloud worker node.

6. The system of claim 4, wherein the scalable cloud environment comprises a cloud master node configured to execute software, the software executing on the cloud master node includes an event handler that is configured to cause the control action to be taken in order to throttle the first virtualized entity when the congestion condition exists for the second virtualized entity based on the cloud-native metrics collected for the second virtualized entity.

7. The system of claim 6, wherein the software executing on the cloud master node includes a metrics collector that is configured to receive the cloud-native metrics collected for the second virtualized entity and determine when the congestion condition exists for the second virtualized entity based on the cloud-native metrics collected for the second virtualized entity.

8. The system of claim 6, wherein the software executing on the cloud master node comprises a probe agent configured request at least some cloud-native metrics collected for the second virtualized entity, receive the requested cloud-native metrics collected for the second virtualized entity, and determine when the congestion condition exists for the second virtualized entity based on the received cloud-native metrics collected for the second virtualized entity, wherein the probe agent is configured to instruct the event handler to cause the control action to be taken in response to determining that the congestion condition exists.

9. The system of claim 4, wherein the cloud native software executing on each cloud worker node that executes the second virtualized entity comprises a metrics agent configured to collect the cloud-native metrics associated with executing the second virtualized entity on said cloud worker node.

10. The system of claim 4, wherein the cloud native software executing on each cloud worker node that executes the second virtualized entity comprises an alarm agent configured determine when the congestion condition exists for the second virtualized entity based on the cloud-native metrics collected for the second virtualized entity, wherein the alarm agent is configured to instruct the event handler to cause the control action to be taken in response to determining that the congestion condition exists.

11. The system of claim 4, wherein the cloud native software executing on each cloud worker node that executes the first virtualized entity comprises a throttle agent that is configured to throttle the first virtualized entity.

12. The system of claim 11, wherein the throttle agent included in the cloud native software executing on each cloud worker node that executes the first virtualized entity is configured to throttle the first virtualized entity by storing a throttle value in a respective environment variable for the first virtualized entity, each throttle value indicative of an amount of throttling to be performed for the first virtualized entity; and wherein the first virtualized entity is configured to check the respective throttle value stored in the respective environment variable for the first virtualized entity and perform the amount of throttling indicated thereby for the first virtualized entity.

13. The system of claim 1, wherein the scalable cloud environment comprises a distributed scalable cloud environment.

14. The system of claim 1, wherein the distributed scalable cloud environment comprises at least one central cloud and at least one edge cloud.

15. A method of providing wireless service to user equipment, the method comprising:

using a scalable cloud environment configured to implement a plurality of virtualized entities that implement a part of a base station to provide the wireless service to the user equipment, wherein the plurality of virtualized entities comprises:

a first virtualized entity configured to perform first processing associated with providing the wireless service to the user equipment; and a second virtualized entity configured to perform second processing associated with providing the wireless service to the user equipment, wherein the first processing generates data that is used by the second processing and that is communicated from the first virtualized entity to the second virtualized entity;

collecting, using cloud native software included in the scalable cloud environment, metrics associated with implementing the second virtualized entity in the scalable cloud environment; and determining when a congestion condition exists for the second virtualized entity based on the cloud-native metrics collected for the second virtualized entity; and in response to determining that the congestion condition exists for the second virtualized entity, causing a control action to be taken in order to throttle the first virtualized entity.

16. The method of claim 15, wherein the first virtualized entity comprises a distributed unit (DU) entity configured to implement at least some Layer-2 functions for the base station; and wherein the second virtualized entity comprises a central unit (CU) entity configured to implement at least some Layer-3 functions for the base station and at least some Layer-2 functions for the base station.

17. The method of claim 15, wherein the first virtualized entity comprises a central unit (CU) entity configured to implement at least some Layer-3 functions for the base station and at least some Layer-2 functions for the base station; and wherein the second virtualized entity comprises a distributed unit (DU) entity configured to implement at least some Layer-2 functions for the base station.

18. The method of claim 15, wherein the scalable cloud environment comprises one or more cloud worker nodes that are configured to execute respective cloud native software that is configured to execute and manage the first and second virtualized entities.

19. The method of claim 18, wherein the cloud native software executing on each cloud worker node that executes the second virtualized entity is configured to collect the cloud-native metrics associated with executing the second virtualized entity on said cloud worker node.

20. The method of claim 18, wherein the scalable cloud environment comprises a cloud master node configured to execute software, the software executing on the cloud master node includes an event handler that is configured to cause the control action to be taken in order to throttle the first virtualized entity when the congestion condition exists for the second virtualized entity based on the cloud-native metrics collected for the second virtualized entity.

21. The method of claim 20, wherein the software executing on the cloud master node includes a metrics collector that is configured to receive the cloud-native metrics collected for the second virtualized entity and determine when the congestion condition exists for the second virtualized entity based on the cloud-native metrics collected for the second virtualized entity.

22. The method of claim 20, wherein the software executing on the cloud master node comprises a probe agent configured request at least some cloud-native metrics collected for the second virtualized entity, receive the requested cloud-native metrics collected for the second virtualized entity, and determine when the congestion condition exists for the second virtualized entity based on the received cloud-native metrics collected for the second virtualized entity, wherein the probe agent is configured to instruct the event handler to cause the control action to be taken in response to determining that the congestion condition exists.

23. The method of claim 18, wherein the cloud native software executing on each cloud worker node that executes the second virtualized entity comprises a metrics agent configured to collect the cloud-native metrics associated with executing the second virtualized entity on said cloud worker node.

24. The method of claim 18, wherein the cloud native software executing on each cloud worker node that executes the second virtualized entity comprises an alarm agent configured determine when the congestion condition exists for the second virtualized entity based on the cloud-native metrics collected for the second virtualized entity, wherein the alarm agent is configured to instruct the event handler to cause the control action to be taken in response to determining that the congestion condition exists.

25. The method of claim 18, wherein the cloud native software executing on each cloud worker node that executes the first virtualized entity comprises a throttle agent that is configured to throttle the first virtualized entity.

26. The method of claim 25, wherein the throttle agent included in the cloud native software executing on each cloud worker node that executes the first virtualized entity is configured to throttle the first virtualized entity by storing a throttle value in a respective environment variable for the first virtualized entity, each throttle value indicative of an amount of throttling to be performed for the first virtualized entity; and wherein the first virtualized entity is configured to check the respective throttle value stored in the respective environment variable for the first virtualized entity and perform the amount of throttling indicated thereby for the first virtualized entity.

27. The method of claim 15, wherein the scalable cloud environment comprises a distributed scalable cloud environment.

28. The method of claim 27, wherein the distributed scalable cloud environment comprises at least one central cloud and at least one edge cloud.

* * * * *